United States Patent
Shimizu

(10) Patent No.: US 9,133,776 B2
(45) Date of Patent: Sep. 15, 2015

(54) CONTROL APPARATUS AND CONTROL METHOD FOR INTERNAL-COMBUSTION ENGINE

(75) Inventor: Hirokazu Shimizu, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 430 days.

(21) Appl. No.: 13/575,652

(22) PCT Filed: Jan. 28, 2011

(86) PCT No.: PCT/JP2011/051787
§ 371 (c)(1),
(2), (4) Date: Jul. 27, 2012

(87) PCT Pub. No.: WO2011/093462
PCT Pub. Date: Aug. 4, 2011

(65) Prior Publication Data
US 2012/0303251 A1    Nov. 29, 2012

Related U.S. Application Data

(63) Continuation of application No. PCT/JP2011/051787, filed on Jan. 28, 2011.

(30) Foreign Application Priority Data

Jan. 28, 2010  (JP) ................................ 2010-016295

(51) Int. Cl.
*F02D 28/00* (2006.01)
*F02D 13/02* (2006.01)
*F02D 41/00* (2006.01)
*F02D 41/22* (2006.01)
(Continued)

(52) U.S. Cl.
CPC .......... *F02D 13/0238* (2013.01); *F02D 41/009* (2013.01); *F02D 41/222* (2013.01);
(Continued)

(58) Field of Classification Search
CPC ..... F02D 28/00; F02D 41/009; F02D 41/042; F02N 11/0814
See application file for complete search history.

(56) References Cited

U.S. PATENT DOCUMENTS 7,624,712 B1 * 12/2009 Pursifull .................... 123/179.4
7,797,099 B2 *  9/2010 Terada .......................... 701/112
(Continued)

FOREIGN PATENT DOCUMENTS

JP    2005-233622    9/2005
JP    2006-233914    9/2006
(Continued)

OTHER PUBLICATIONS

Chinese Patent Office Action dated Sep. 3, 2014, in Appln. No. 201180007268.2 with its English translation.

*Primary Examiner* — Stephen K Cronin
*Assistant Examiner* — Xiao Mo
(74) *Attorney, Agent, or Firm* — Foley & Lardner LLP

(57) ABSTRACT

A control apparatus and a control method diagnose whether an internal-combustion engine is rotated in forward or reverse directions is being properly implemented. Specifically, based on a pulse width WIPOS of a rotation signal POS output by a crank angle sensor, it is determined whether a crankshaft is rotated in the forward or the reverse directions. Based on the determination of the rotating direction of the crankshaft, a counter CNTPOS, which denotes a count value of rotation signal POS, is updated. At the time of restarting the engine, counter CNTPOS is updated, using a value on counter CNTPOSz at the time of stopping the engine as an initial value. If the value on counter CNTPOS at a crank angle position determined after the starting of the engine differs from an expected value, then the function for determining the rotating direction of the crankshaft is diagnosed to be abnormal.

9 Claims, 14 Drawing Sheets

(51) Int. Cl.
*F02N 11/08* (2006.01)
*F01L 1/053* (2006.01)
*F02D 9/10* (2006.01)
*F01L 1/34* (2006.01)

(52) U.S. Cl.
CPC ............... *F02N11/0825* (2013.01); *F01L 1/34* (2013.01); *F01L 2001/0537* (2013.01); *F01L 2800/03* (2013.01); *F01L 2820/041* (2013.01); *F01L 2820/042* (2013.01); *F02B 2275/16* (2013.01); *F02D 9/105* (2013.01); *F02D 2013/0292* (2013.01); *F02N 2200/021* (2013.01); *Y02T 10/18* (2013.01); *Y02T 10/40* (2013.01); *Y02T 10/48* (2013.01)

(56) References Cited

U.S. PATENT DOCUMENTS

| | | | |
|---|---|---|---|
| 2002/0161507 A1* | 10/2002 | Fuse | 701/112 |
| 2005/0278109 A1* | 12/2005 | Ando | 701/112 |
| 2008/0215225 A1 | 9/2008 | Nakamura | |
| 2009/0020100 A1 | 1/2009 | Sakaigaki et al. | |

FOREIGN PATENT DOCUMENTS

| | | |
|---|---|---|
| JP | 2009-236003 | 10/2009 |
| JP | 2010-106661 | 5/2010 |

* cited by examiner

CONTROL APPARATUS AND CONTROL METHOD FOR INTERNAL-COMBUSTION ENGINE

This application is a continuation of PCT/JP2011/051787, filed on Jan. 28, 2011.

BACKGROUND OF THE INVENTION

1. Field of the Invention

The present invention relates to a control apparatus and a control method for an internal-combustion engine, and more particularly, to an apparatus and a method for determining whether a crankshaft is rotating in a forward direction or a reverse direction and detecting a crank angle based on the determined crankshaft rotating direction.

2. Description of Related Art

Hitherto, there has been known a control apparatus for an internal-combustion engine adapted to detect a reverse rotation of an internal-combustion engine before the stopping of the engine and then detect a crank angle at the time of stopping the engine. Fuel injection and ignition are started at an early stage after the starting of engine and, in order to improve the starting performance of the internal-combustion engine, the crank angle at the time of stopping the engine is stored, and at the time of restarting the engine, the crank angle is estimated by using the stored crank angle at the time of stopping the engine as an initial value. Based on the estimated crank angle, the fuel injection and the ignition are started. At the time of stopping the engine, the internal-combustion engine rotates in a reverse direction once before the stopping of the engine due to the pressure in a combustion chamber (refer to, for example, Japanese Laid-Open Patent Publication No. 2006-233914).

Meanwhile, as a method for determining whether an internal-combustion engine is rotated in the forward or the reverse direction, there is a method in which a rotation sensor (crank angle sensor), which outputs a pulse signal synchronized with the rotation of a crankshaft, is provided, and the pulse width and amplitude of the pulse signal are adapted to change according to whether a rotating direction of the engine is in the forward direction or the reverse direction. The measured values of the pulse width and amplitude are compared with threshold values thereof, so that whether the engine is rotated in the forward direction or the reverse direction is determined.

However, variations, deterioration or the like of the rotation sensor or circuits that process rotation signals leads to variations in the pulse width and amplitude at the time of a forward rotation or a reverse rotation, resulting in deteriorated accuracy of determining a rotating direction of the engine. Hence, there is a possibility of incorrectly determining whether the internal-combustion engine (crankshaft) is rotated in the forward direction or the reverse direction.

Furthermore, the incorrect determination of a rotating direction of the engine immediately before the stopping of the engine causes incorrect detection of a crank angle at the time of the stopping of the engine, and the crank angle immediately after the starting of the engine is estimated on the basis of the information on the incorrect stop position. Controlling the fuel injection and ignition based on the estimation result raises a problem in that fuel injection or ignition is set on a wrong cylinder, causing the occurrence of abnormal combustion, such as afterburning or backfire, or deteriorated exhaust property or starting performance.

SUMMARY OF THE INVENTION

Therefore, in view of the above conventional problems, the present invention has as an object to provide a control apparatus for an internal-combustion engine capable of diagnosing whether a rotating direction of the engine is being properly determined.

Therefore, according to the present invention, it is determined whether a crankshaft of an internal-combustion engine is rotated in the forward direction or the reverse direction, the crank angle when the internal-combustion engine stops is detected on the basis of the result of the determination of the rotating direction of the engine, and the crank angle estimated on the basis of the crank angle at the time of the stopping the engine is compared with the crank angle detected after the starting of the internal-combustion engine, so that whether the determination of a rotating direction of the engine is abnormal or not is diagnosed.

The present invention described above makes it possible to diagnose the determination whether an internal-combustion engine (crankshaft) is rotated in the forward direction or the reverse direction is being normally carried out, thereby preventing fuel injection, ignition or the like of the internal-combustion engine from being controlled on the basis of an incorrect determination result.

Other objects and features of the present invention will be understood from the following description with reference to the accompanying drawings.

DESCRIPTION OF PREFERRED EMBODIMENTS

The following will explain in detail an embodiment of the present invention with reference to the accompanying drawings.

Figure 1:
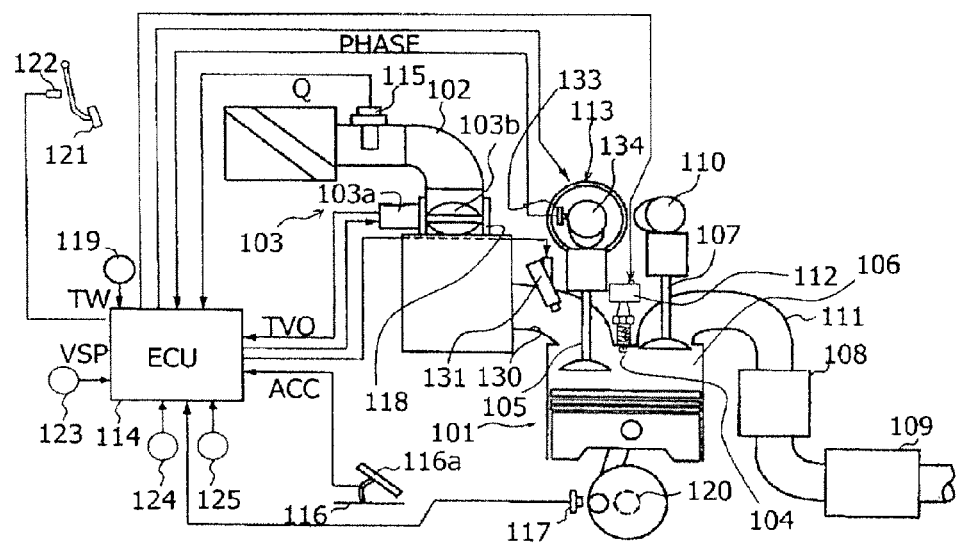
FIG. 1 is a system configuration view illustrating an internal-combustion engine in an embodiment of the present invention.

FIG. 1 is a configuration view of a vehicle internal-combustion engine 101 to which a control apparatus according to the present invention is applied. In the present embodiment, internal-combustion engine 101 is a straight-four, 4-cycle engine.

In FIG. 1, an intake pipe 102 of internal-combustion engine 101 is provided with an electronic control throttle 103, which drives to open and close a throttle valve 103b by a throttle motor 103a.

Furthermore, internal-combustion engine 101 takes air into a combustion chamber 106 of each cylinder through electronic control throttle 103 and an intake valve 105.

An intake port 130 of each cylinder is provided with a fuel injection valve 131, and fuel injection valve 131 opens in response to an injection pulse signal from an ECU (engine control unit) 114 acting as a control apparatus and injects a fuel.

The fuel in combustion chamber 106 is ignited and burns by spark ignition by a spark plug 104. Each spark plug 104 is provided with an ignition module 112 incorporating an ignition coil and a power transistor, which controls the supply of power to the ignition coil.

The combustion gas in combustion chamber 106 flows out into an exhaust pipe 111 through an exhaust valve 107. A front catalytic converter 108 and a rear catalytic converter 109 provided on exhaust pipe 111 purify the exhaust gas flowing through exhaust pipe 111.

An intake camshaft 134 and an exhaust camshaft 110 are provided with cams in an integral manner to actuate intake valve 105 and exhaust valve 107 by the cams.

Intake valve 105 and exhaust valve 107, or one of intake valve 105 and exhaust valve 107 may be provided with a variable valve mechanism in which at least one of a valve timing, a maximum valve lift amount and a valve operating angle is variable.

ECU 114 has a built-in microcomputer and carries out arithmetic operation according to a program stored in a memory beforehand, to thereby control electronic control throttle 103, fuel injection valve 131, ignition module 112 and the like.

ECU 114 receives detection signals from various sensors. The various sensors include, for example, an accelerator opening sensor 116 which detects the opening degree of an accelerator pedal 116a (the opening degree of the accelerator) ACC, an airflow sensor 115 which detects an intake air volume Q of internal-combustion engine 101, a crank angle sensor (rotation sensor) 117 which outputs a pulse-type rotation signal (unit crank angle signal) POS according to the rotation of a crankshaft 120, which is an output shaft of internal-combustion engine 101, a throttle sensor 118 which detects an opening degree TVO of throttle valve 103b, a water temperature sensor 119 which detects a temperature TW of the cooling water of internal-combustion engine 101, a cam sensor 133 which outputs a pulse-type cam signal PHASE according to the rotation of intake camshaft 134, a brake switch 122 which is turned on in a brake state in which a driver of the vehicle steps on a brake pedal 121, and a vehicle speed sensor 123 which detects the traveling speed of the vehicle (vehicle speed) VSP and which uses internal-combustion engine 101 as the motive power source thereof.

Furthermore, ECU 114 receives ON and OFF signals of an ignition switch 124, which is the main switch for turning internal-combustion engine 101 ON and OFF, and ON and OFF signals of a starter switch 125.

Figure 2:
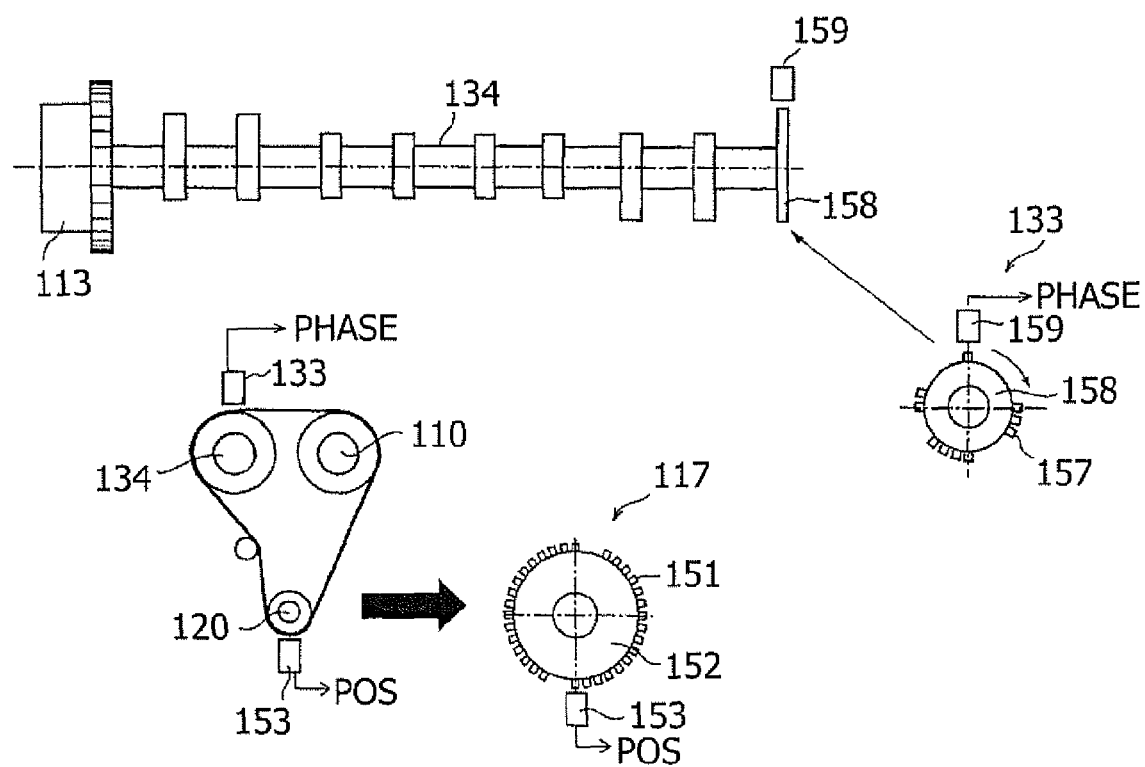
FIG. 2 is a view illustrating the constructions of a crank angle sensor and a cam sensor in the embodiment.

FIG. 2 illustrates the constructions of crank angle sensor 117 and cam sensor 133.

Crank angle sensor 117 includes a signal plate 152 and a rotation detector 153. Signal plate 152 is rotatably supported by crankshaft 120 and has, on its circumference, projections 151 which serve as objects to be detected. Rotation detector 153 is secured at the side of internal-combustion engine 101, and detects projections 151 and outputs rotation signals POS.

Rotation detector 153 is provided with various processing circuits including a waveform generating circuit and a selection circuit, and pickups for detecting projections 151. Rotation signal POS output from rotation detector 153 is a pulse signal composed of a pulse train which normally remains at a low level and switches to a high level for only predetermined time when projections 151 are detected.

Projections 151 of signal plate 152 are formed at regular intervals of 10-degree pitches in terms of crank angle. There are two absent portions of projections 151. In each of the absent portions, two projections 151 are consecutively absent. The two absent portions are located at opposite sides of the central axis of crankshaft 120.

Alternatively, the number of absent projections 151 may be one or three or more in succession.

Figure 3:
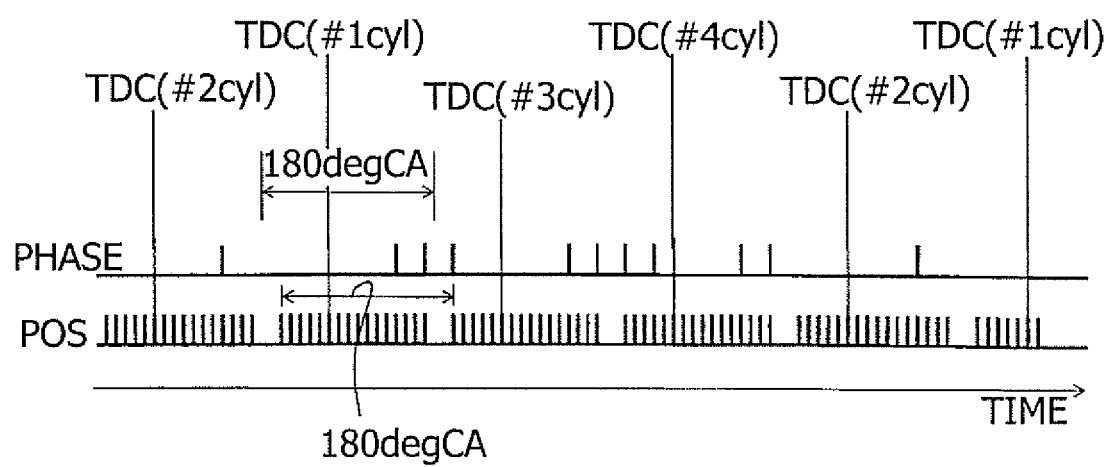
FIG. 3 is a time chart illustrating the output characteristics of the crank angle sensor and the cam sensor in the embodiment.

With the arrangement described above, rotation signal POS output from crank angle sensor 117 (rotation detector 153) switches to the high level for sixteen consecutive times for each 10 degrees (unit crank angle) in terms of crank angle, and thereafter, remains at the low level for 30 degrees, and then switches back to the high level for sixteen consecutive times, as illustrated in FIG. 3.

Thus, the first rotation signal POS following the low-level period of 30-degrees crank angle (a projection absent area or an absent portion) will be output at 180-degree crank angle intervals. The 180-degree crank angle corresponds to a stroke phase difference between cylinders, i.e., an ignition interval, in 4-cylinder engine 101 of the present embodiment.

Furthermore, in the present embodiment, crank angle sensor 117 is set to output the first rotation signal POS following the low-level period of the 30-degrees crank angle (the absent projection area) at the piston position of 50 degrees before a top dead center (BTDC50degrees) of each cylinder.

Meanwhile, cam sensor 133 includes a signal plate 158 and a rotation detector 159. Signal plate 158 is rotatably supported by an end of intake camshaft 134 and has, on its circumference, projections 157 which serve as objects to be detected Rotation detector 159 is secured at the side of internal-combustion engine 101, and detects projections 157 and outputs a cam signal PHASE.

Rotation detector 159 has various processing circuits, including a waveform shaping circuit and pickups for detecting projections 157.

Projections 157 of signal plate 158 are provided such that one, three, four, and two, respectively, are located at four positions for each 90-degree cam angle. For the portions in which a plurality of projections 157 is consecutively provided, the pitch of projections 157 is set to 30-degree crank angle (15-degree cam angle).

Furthermore, as illustrated in FIG. 3, cam signal PHASE output from cam sensor 133 (rotation detector 159) is a pulse signal composed of a pulse train which normally remains at a low level and switches to a high level for only a predetermined time when projections 157 are detected, and switches to the high level for one projection alone, three consecutive projections, four consecutive projections, and two consecutive projections, respectively, for each 90-degrees cam angle or 180-degrees crank angle.

Furthermore, cam signal PHASE of one projection alone and the leading signal of a plurality of cam signals PHASE consecutively output are set such that they are output at 180-degree crank angle intervals and the output patterns of the one projection alone, the three consecutive projections, the four consecutive projections, and the two consecutive projections, respectively, are output between top dead center TDC of a certain cylinder and top dead center TDC of the next cylinder.

More specifically, setting has been made such that three cam signals PHASE are consecutively output between a compression top dead center TDC of a first cylinder and a compression top dead center TDC of a third cylinder, four cam signals PHASE are consecutively output between the compression top dead center TDC of the third cylinder and the compression top dead center TDC of a fourth cylinder, two cam signals PHASE are consecutively output between the compression top dead center TDC of the fourth cylinder and the compression top dead center TDC of a second cylinder, and one cam signal PHASE alone is output between the compression top dead center TDC of the second cylinder and the compression top dead center of the first cylinder.

If a variable valve mechanism is provided, whereby making the rotation phase of intake cam shaft 134 variable relative to crankshaft 120 so as to make the valve timing of intake valve 105 variable, then an arrangement is to be made such that the output position of cam signal PHASE will not change across top dead center TDC even if the valve timing is changed.

In other words, the output position and the output interval of cam signal PHASE are set, taking into account the changing range of the valve timing such that the number of cam signals PHASE output between top dead centers TDC remain unchanged even if the valve timing is changed.

The number of consecutive outputs of cam signals PHASE that are output between top dead centers TDC indicates the cylinder number to have the next compression top dead center. For example, if three cam signals PHASE are consecutively output between a current top dead center TDC and a previous top dead center TDC, then current top dead center TDC indicates compression top dead center TDC of the third cylinder.

Four-cylinder engine 101 according to the present embodiment carries out ignition in the order of the first cylinder, the third cylinder, the fourth cylinder, and the second cylinder. Hence, the output pattern of cam signals PHASE output between top dead centers TDC is set to establish the order of one signal alone, three consecutive signals, four consecutive signals, and two consecutive signals, as illustrated in FIG. 3.

ECU 114 identifies, for example, a projection absent position of rotation signal POS on the basis of a cycle change or the like of rotation signal POS, and counts the number of occurrences of rotation signal POS by using the projection absent position as the reference to thereby detect top dead center TDC (a reference crank angle position REF). In the present embodiment, a sixth rotation signal POS output after the projection absent area of rotation signal POS corresponds to top dead center TDC of each cylinder.

Then, ECU 114 counts the number of cam signals PHASE output between top dead centers TDC to identify the next cylinder of which the piston position reaches compression top dead center TDC (a predetermined piston position), and also counts the number of occurrences of rotation signal POS from top dead center TDC to detect the crank angle at that time on the basis of the count value CNTPOS.

Upon the detection of the cylinder having compression top dead center TDC and the crank angle, ECU 114 determines the cylinder to which fuel is to be injected and which is to be ignited, also determines the fuel injection timing and the ignition timing, and then outputs an injection pulse signal and ignition control signal according to the angle of crankshaft 120 (crank angle) detected on the basis of the count value CNTPOS.

The determination result of the cylinder, of which the piston position reaches compression top dead center TDC (the predetermined piston position) is updated in the order of the ignition. Therefore, after identifying the next cylinder of which the piston position reaches compression top dead center TDC (the predetermined piston position) by counting the number of cam signal PHASE output between top dead centers TDC, the cylinder reaching compression top dead center TDC can be updated for each top dead center TDC according to the order of the ignition.

The interval during which the number of occurrences of cam signal PHASE is counted is not limited to the period between top dead centers TDC. Instead, any crank angle (piston position) may be set as the reference for the interval during which the number of occurrences of cam signal PHASE is counted.

Furthermore, instead of identifying the cylinder of which a piston is at the predetermined piston position on the basis of the number of occurrences of cam signal PHASE, the cylinder of which a piston is at the predetermined piston position can be determined on the basis of the difference in pulse width between cam signals PHASE.

Furthermore, in the present embodiment, a part of the pulse train of rotation signal POS is absent so as to make it possible to detect the angular position (crank angle) of crankshaft 120 by using the absent position as the reference. Alternatively, however, rotation signals POS may be output without skipping them for every 10 degrees, and a reference position sensor that generates a signal at a reference crank angle position for each 180-degree crank angle may be provided instead. Counting rotation signals POS on the basis of the output signal of the reference position sensor allows the angular position (crank angle) of crankshaft 120 to be detected.

Meanwhile, when internal-combustion engine 101 (crankshaft 120) is rotated in the forward direction, the occurrence of rotation signal POS indicates that crankshaft 120 has rotated in the forward direction by 10 degrees, and the number of occurrences of rotation signal POS from the reference crank angle position indicates the rotation angle of crankshaft 120 from the reference crank angle position.

However, there are cases in which internal-combustion engine 101 (crankshaft 120) rotates in the reverse direction due to a compression pressure in a cylinder or the like immediately before the stopping of internal-combustion engine 101. Hence, if counting of the number of occurrences of rotation signal POS is continued even during the rotation in the reverse direction in the same manner as in the forward rotation, then the incorrect angular position of crankshaft 120 (crank angle) will be detected.

Figure 4:
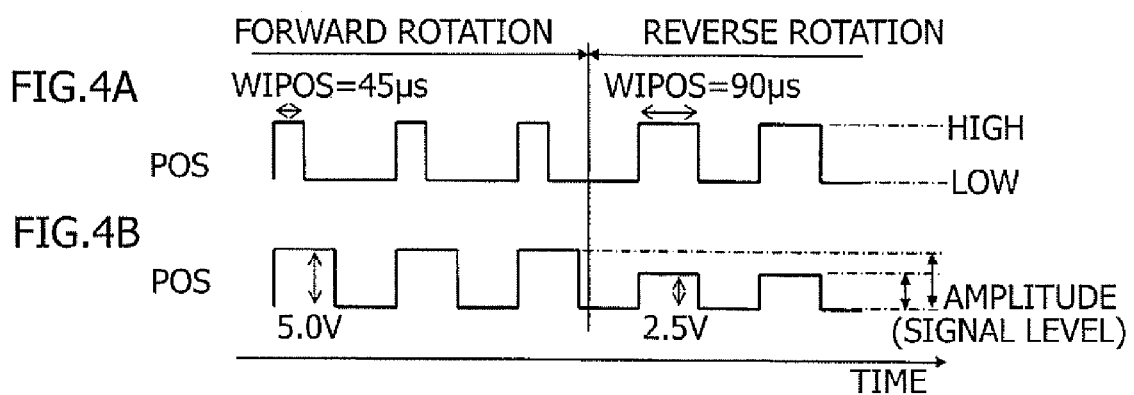
FIG. 4 is a time chart illustrating the differences in the pulse width and amplitude of a rotation signal between a forward rotation and a reverse rotation in the embodiment.

Therefore, crank angle sensor 117 (rotation detector 153) is adapted to output rotation signals POS (pulse signals) of which pulse widths differ between the forward rotation and the reverse rotation of crankshaft 120 so as to determine whether internal-combustion engine 101 (crankshaft 120) is rotated in the forward direction or the reverse direction (refer to FIG. 4A).

As a method for generating pulse signals having different pulse widths according to the rotating direction of a rotation shaft, the method disclosed in, for example, Japanese Laid-Open Patent Publication No. 2001-165951, is used. More specifically, two signals having the phases thereof shifted to each other, are generated as the pulse signals for detecting projections 151 of signal plate 152, and the two signals are compared with each other to thereby determine whether crankshaft 120 is rotated in the forward direction or the reverse direction. Then, one of the two pulse signals to be generated to have different pulse widths WIPOS to each other is selected on the basis of the result of the determination of the rotating direction of the engine, and then, the selected pulse signal is output.

ECU 114 measures pulse width WIPOS of rotation signal POS and compares the measured value of pulse width WIPOS with a threshold value SL, which is a threshold value for determining whether crankshaft 120 is rotated in the forward direction or the reverse direction, thereby to determine whether the pulse signal has pulse width WIPOS in the forward rotation or pulse width WIPOS in the reverse rotation. Thus, it is determined whether crankshaft 120 is rotated in the forward direction or the reverse direction.

Threshold value SL used to determine a rotating direction of the engine is set to an intermediate value (e.g., 55 μs to 80 μs) between pulse width WIPOS in the forward rotation and pulse width WIPOS in the reverse rotation. In the present embodiment in which pulse width WIPOS in the reverse rotation is greater than pulse width WIPOS in the forward rotation, it is determined that the rotation is in the reverse direction if pulse width WIPOS is equal to or greater than threshold value SL, or it is determined that the rotation is in the forward direction if pulse width WIPOS is below threshold value SL.

In the present embodiment, as illustrated in FIG. 4A, pulse width WIPOS in the forward rotation has been set to 45 μs and pulse width WIPOS in the reverse rotation has been set to 90 μs; however, pulse width WIPOS is not limited to the aforesaid 45 μs or 90 μs. Alternatively, pulse width WIPOS in the forward rotation may be set to be greater than that in the reverse rotation.

Furthermore, in the example illustrated in FIG. 4A, rotation signal POS has been set to be a pulse signal that normally remains at the low level and switches to the high level for only predetermined time when the predetermined angular position is reached. Alternatively, however, rotation signal POS may be a pulse signal that normally remains at the high level and switches to the low level only for a predetermined time when the predetermined angular position is reached. In this case, the low level period is set to change according to the direction of rotation, so that the direction of rotation can be determined by carrying out measurement, using the length of the low level period as pulse width WIPOS.

Furthermore, alternatively, as illustrated in FIG. 4B, the amplitude (signal level) of rotation signal POS may be set to change according to whether a rotating direction of the engine is in the forward direction or the reverse direction, thus making it possible to determine whether crankshaft 120 is rotated in the forward rotation or the reverse rotation based on the difference in the amplitude (signal level).

In the example illustrated in FIG. 4B, rotation signal POS is the pulse signal that normally remains at the low level and switches to the high level only for the predetermined time when the predetermined angular position is reached. The pulse signal is set such that the signal level is higher in the forward rotation than in the reverse rotation when the predetermined angular position is reached. More specifically, setting is made such that a 5-volt signal is output in the forward rotation, while a 2.5-volt signal is output in the reverse rotation.

Furthermore, as illustrated in FIG. 5A, when crankshaft 120 rotates in the forward direction, the rotation angle of crankshaft 120 in the forward direction is detected by increasing count value CNTPOS each time rotation signal POS occurs, and when crankshaft 120 rotates in the reverse rotation, the aforesaid count value CNTPOS is decreased in response to the occurrence of rotation signal POS, thus decreasing the rotation angle in the forward direction by the angle for which crankshaft 120 has rotated in the reverse rotation.

Figure 5:
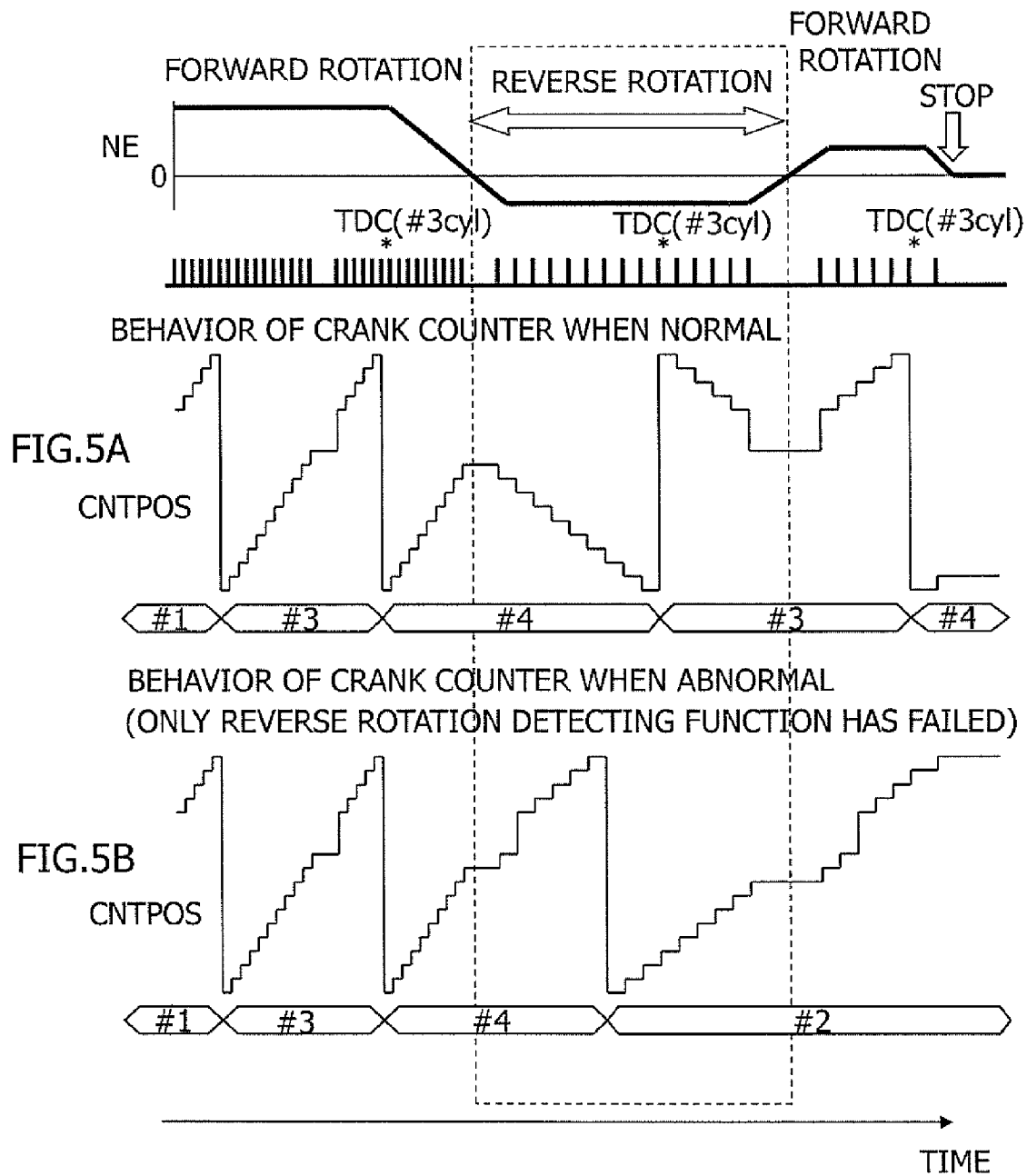
FIG. 5 shows time charts illustrating how counter CNT-POS increases or decreases in the embodiment, FIG. 5A being a time chart illustrating a change observed in the case in which a reverse rotation has been correctly detected, and FIG. 5B being a time chart illustrating a change observed in the case in which a reverse rotation is not detected.

As illustrated in FIG. 5, count value CNTPOS of rotation signals POS is changed in steps, namely, 10 and 13, with the absent projection portion therebetween. This is the processing for counter value CNTPOS to indicate the number of occurrences of rotation signal POS in the case in which there is no absent projection portion.

Furthermore, if top dead center TDC is crossed during the reverse rotation, as illustrated in FIG. 5A, then the detection result of the cylinder of which a piston is at the predetermined piston position is returned to a previous cylinder in the ignition order, thereby detecting the piston position of each cylinder when internal-combustion engine 101 stops.

According to the pattern given in FIG. 5A, the data of the cylinder at the predetermined piston position is updated in the order of the first cylinder, the third cylinder, the fourth cylinder, the third cylinder, and the fourth cylinder. This indicates a state in which internal-combustion engine 101 rotates in the reverse direction after passing top dead center TDC of the third cylinder and then returns, crossing top dead center TDC of the third cylinder again. Then, internal-combustion engine 101 switches from the reverse rotation to the forward rotation between top dead center TDC of the first cylinder and top dead center TDC of the third cylinder, and stops, crossing top dead center TDC of the third cylinder.

As described above, determining whether a rotating direction of the engine is in the forward direction or the reverse direction, and then detecting the crank angle makes it possible to accurately detect the crank angle at the time of the stopping of the engine and the piston position of each cylinder at the time of the stopping of the engine even when the reverse rotation takes place immediately before internal-combustion engine 101 stops.

Furthermore, storing the stop position of crankshaft 120 and the cylinder determined to be in the predetermined piston position during stopping of internal-combustion engine 101, makes it possible to estimate the crank angle at the time of starting the engine on the assumption that crankshaft 120 rotates from the crank angle at the time of stopping the engine, which serves as the initial position, when internal-combustion engine 101 restarts, and also makes it possible to identify the cylinder of which a piston is at the predetermined piston position, thus allowing the fuel injection and the ignition to be started earlier with resultant improved starting responsiveness.

If the crank angle at the time of stopping the engine is unknown, the crank angle remains unknown until a reference crank angle position (the absent portion of rotation signal POS) is detected for the first time after the starting of the engine. Furthermore, the cylinder of a which piston is at the predetermined piston position can be determined only after a second reference crank angle position is detected, so that the cylinder in which the fuel injection and the ignition are to be carried cannot be determined until the second reference crank angle position is detected, thus delaying the start of the fuel injection and the ignition.

According to the present embodiment, ECU 114 has an idle reduction control function, which automatically stops internal-combustion engine 101 when an automatic stop condition is established while internal-combustion engine 101 is an idling operation state, and, after the automatic stop of internal-combustion engine 101, automatically restarts internal-combustion engine 101 when a restart condition is established.

Furthermore, high starting response is required at the restart from the stop state set by the idle reduction control. As described above, therefore, storing the crank angle and the cylinder of which a piston is at the predetermined piston position at the time of stopping the engine so as to use the data as the initial values to estimate the crank angle and the cylinder of which a piston is at the predetermined piston position makes it possible to start the fuel injection and the ignition before the crank angle and the cylinder of which a piston is at the predetermined piston position are detected on the basis of rotation signal POS and cam signal PHASE, thus allowing high starting responsiveness to be achieved.

According to the idle reduction control, if all conditions are established, for example, vehicle speed VSP is 0 km/h, engine speed NE is equal to a predetermined revolution speed or lower, accelerator opening ACC is fully closed, brake switch 122 is ON (braked state), and cooling water temperature TW is equal to a predetermined temperature or higher, then it is determined that the idle reduction condition (the automatic stop condition) has been established, and the fuel injection and the ignition are stopped and then internal-combustion engine 101 is automatically stopped.

The predetermined revolution speed is the value for determining the idle operation state of internal-combustion engine 101 and set to be slightly higher than a desired idling speed. The predetermined temperature indicates the value for permitting the automatic stop in a state in which internal-combustion engine 101 has been fully warmed up (a state after warm-up).

Meanwhile, in the state in which internal-combustion engine 101 has been automatically stopped, if, for example, brake switch 122 is changed to OFF (non-braked state), the accelerator pedal is depressed, the duration time of the automatic stop state becomes longer than reference time, or a low battery voltage is detected, then it is determined that the restart condition has been established and the fuel injection and the ignition are resumed on internal-combustion engine 101.

According to the present embodiment, a starter motor is used to start rotating internal-combustion engine 101 at the restart from the stop state set by the idle reduction control.

Figure 6:
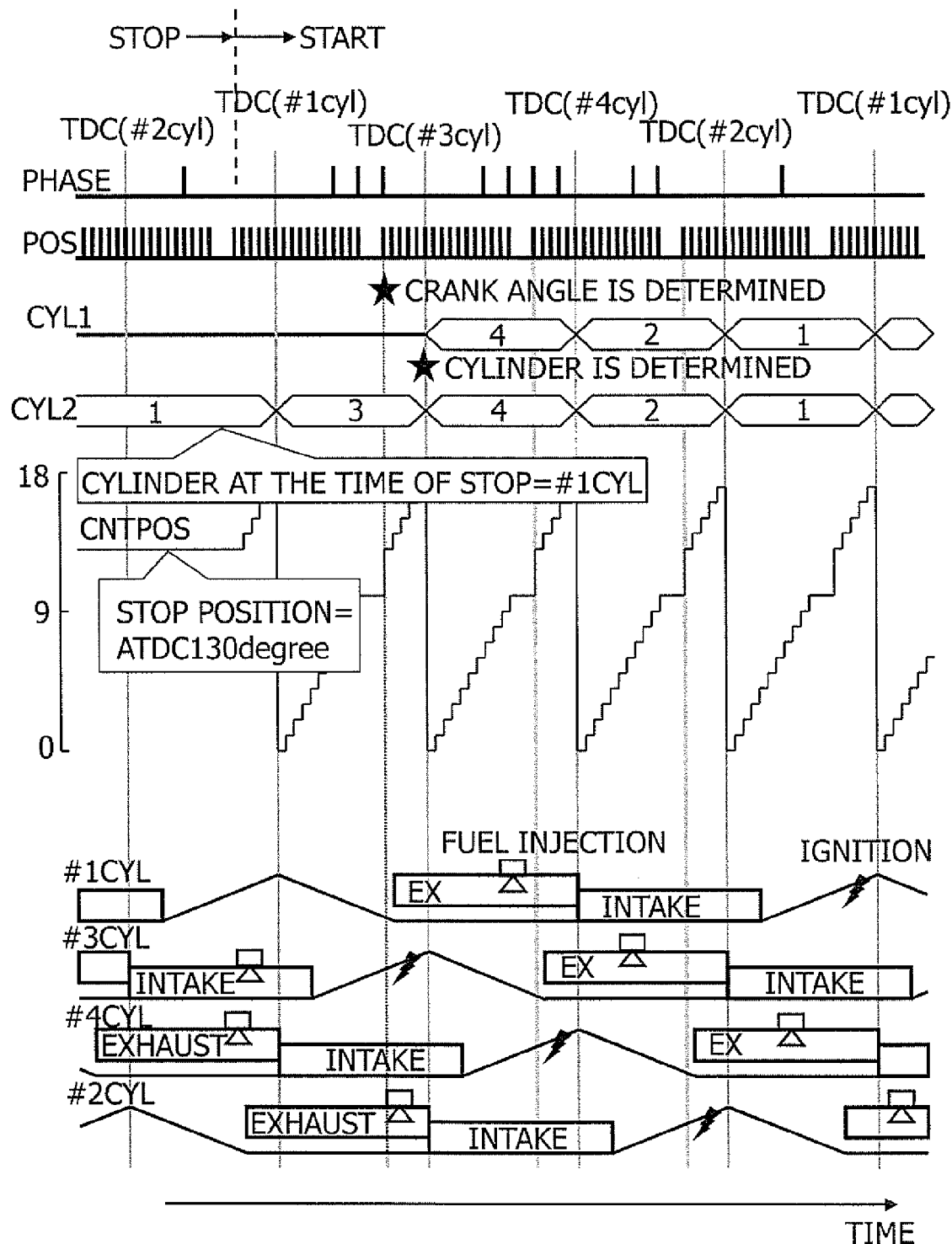
FIG. 6 is a time chart illustrating the fuel injection and ignition control at the time of restarting the engine based on correct determination of the forward or the reverse rotation in the embodiment.

FIG. 6 illustrates the control of the fuel injection and the ignition at the time of restarting the engine on the basis of the stored data on the crank angle and the cylinder of which a piston is at the predetermined piston position at the time of stopping the engine of internal-combustion engine 101 (count value CNTPOS).

The example given in FIG. 6 illustrates that internal-combustion engine 101 stops before the compression top dead center of the first cylinder, and the crank angle position at the time of stopping the engine is 50 degrees before the compression top dead center of the first cylinder (BTDC 50 degrees).

The aforesaid data at the time of stopping the engine indicates that internal-combustion engine 101 has stopped in an intake stroke of the third cylinder and in an exhaust stroke of the fourth cylinder. Hence, upon starting the engine, ECU 114 performs the fuel injection to the third cylinder which has stopped in the intake stroke, and the fourth cylinder which has stopped in the exhaust stroke, and then sets ignition on these third cylinder and fourth cylinder.

Furthermore, when rotation signal POS occurs at the time of starting the engine, count value CNTPOS, which uses the value at the time of stopping the engine as the initial value, is counted up and also the compression top dead center of the first cylinder is detected on the basis of the result of the counting up. Upon the detection of the compression top dead center of the first cylinder, the data on the next cylinder of which the piston position reaches the compression top dead center next is updated to the third cylinder, count value CNTPOS is reset to zero at the top dead center position to allow the rotation angle after the top dead center to be estimated on the basis of count value CNTPOS, and the timing for starting to energize the ignition coil on the basis of count value CNTPOS and the like are decided.

After the starting of the engine, until a projection absent portion of rotation signal POS is detected, the crank angle at the time point is estimated by updating count value CNTPOS on the basis of the value at the previous time of stopping the engine. Once the projection absent portion of rotation signal POS is detected, the crank angle at the time point is determined to be ATDC 130 degrees (BTDC 50 degrees), independently of the estimation result based on the stored data at the time of stopping the engine. Thereafter, count value CNTPOS is updated on the basis of the determined position so as to detect the crank angle.

After the projection absent portion is detected for the first time and the crank angle is determined, a second top dead center will be detected on the basis of the count value of rotation signal POS from the determined crank angle position, and the cylinder before the compression top dead center will be determined from the number of cam signals PHASE output between the first top dead center and the second top dead center after the starting of the engine.

In FIG. 6, CYL indicates the number of the cylinder before reaching the compression top dead center, CYL1 indicates a cylinder detected by counting the number of cam signals PHASE, and CYL2 indicates a result estimated to be the cylinder before the compression top dead center on the basis of the position of each piston position at the time of stopping the engine.

In the case in which the fuel injection and the ignition are started after the crank angle and the cylinder before the compression top dead center are determined, in the example illustrated in FIG. 6, cylinder #1 in the exhaust stroke when the cylinder is determined and the second cylinder to be in the intake stroke immediately after the cylinder is determined will be the cylinders that permit fuel injection first, thus delaying the start of the fuel injection and the ignition with consequent deteriorated starting responsiveness, as compared with the case in which the fuel injection is started according to the estimated value on the basis of the crank angle and each piston position at the time of stopping the engine.

Meanwhile, whether crankshaft 120 is rotated in the forward direction or the reverse direction is determined by comparing pulse width WIPOS of rotation signal POS with threshold value SL, as described above. However, the measured value of pulse width WIPOS of rotation signal POS fluctuates due to variations in the output of crank angle sensor 117 (rotation detector 153) and further due to variations in a circuit of ECU 114, which measures pulse width WIPOS.

This may lead to deteriorated accuracy of determination of the forward rotation and the reverse rotation.

If it is incorrectly determined that the crankshaft is rotating in the forward direction, whereas the crankshaft is actually rotating in the reverse direction, then the crank angle and the cylinder of which a piston is at the predetermined piston position at the time of stopping the engine will be incorrectly detected, and if the crank angle and the cylinder of which a piston is at the predetermined piston position after the starting of the engine are estimated on the basis of the crank angle position and the cylinder of which a piston is at the predetermined piston position at the time of stopping the engine and the fuel injection and the ignition are controlled at the time of the restarting of the engine on the basis of the estimated value, then the fuel injection and the ignition will be incorrectly carried out on a wrong cylinder or at a wrong timing.

FIG. 5B illustrates changes in count value CNTPOS in the case in which the reverse rotation is not able to be detected and the reverse rotation is incorrectly determined as the forward rotation, and also illustrates the results of determination on a cylinder before the compression top dead center.

As illustrated in FIG. 5B, if the reverse rotation is incorrectly determined as the forward rotation, then count value CNTPOS, which indicates the rotation angle after the top dead center, will be changed to increase despite the reverse rotation. Hence, the position of the top dead center will be incorrectly detected and the cylinder before the compression top dead center will be incorrectly determined.

Figure 7:
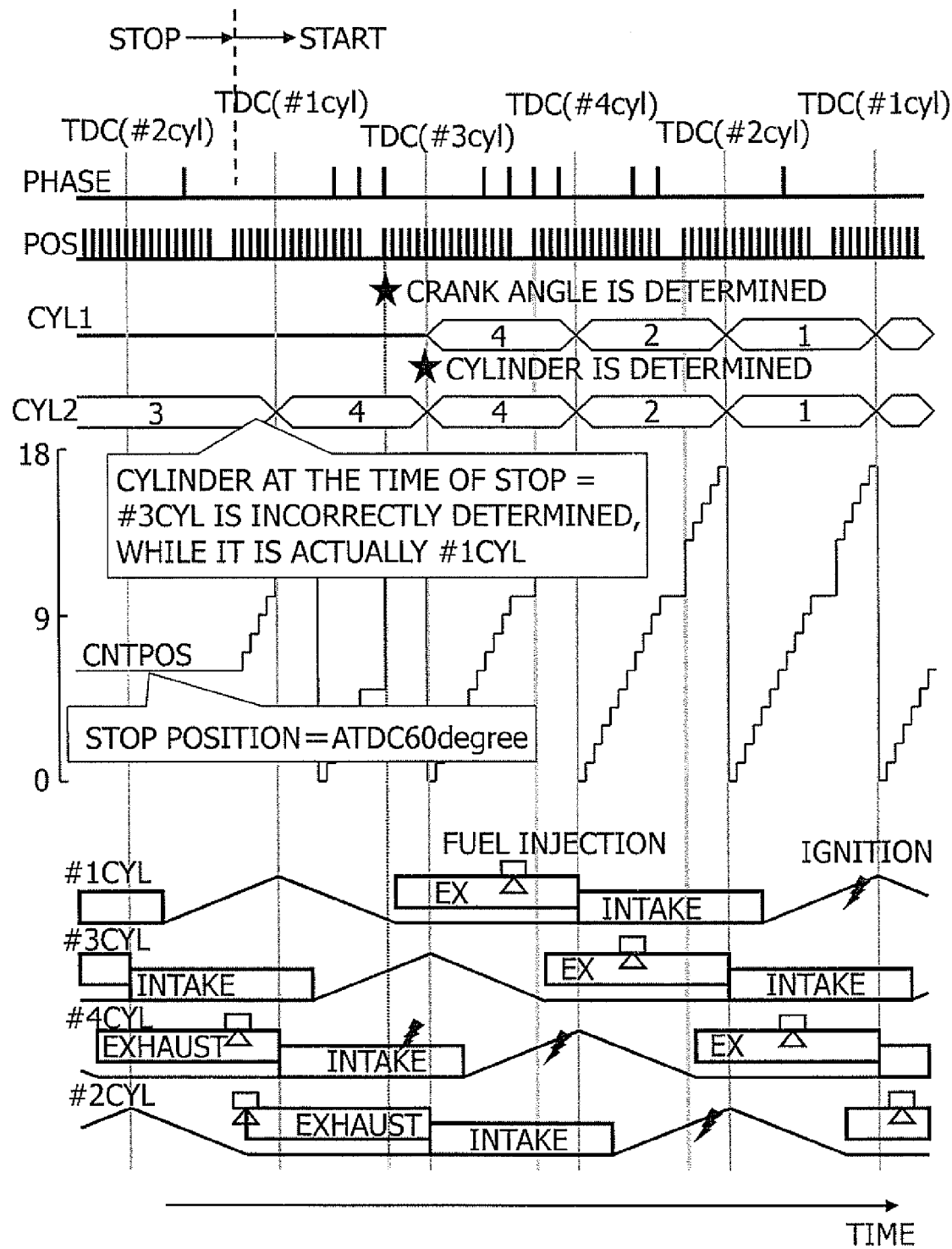
FIG. 7 is a time chart illustrating the fuel injection and ignition control at the time of restarting the engine based on incorrect determination of a rotating direction of the engine in the embodiment.

Then, as illustrated in FIG. 7, in the case in which the stop position is incorrectly determined, since the crank angle and the cylinder before the compression top dead center after the restarting of the engine are estimated on the basis of the stop position, the fuel injection and the ignition are performed at a wrong cylinder, so that abnormal combustion, such as a backfire occurs.

FIG. 7 illustrates a case in which a failure to detect the reverse rotation leads to an incorrect detection that internal-combustion engine 101 has stopped before the compression top dead center of the third cylinder, whereas internal-combustion engine 101 has actually stopped before the compression top dead center of the first cylinder.

Before the compression top dead center of the third cylinder, the fourth cylinder is in an intake stroke and the second cylinder is in an exhaust stroke. In the example illustrated in FIG. 7, therefore, based on the memory that internal-combustion engine 101 has stopped before the compression top dead center of the third cylinder, the fuel is injected to the fourth cylinder and the second cylinder at the time of the restarting the engine. Actually, however, internal-combustion engine 101 stopped before the compression top dead center of the first cylinder, and the fourth cylinder to which the fuel has been injected is actually in an exhaust stroke, and thus, the fourth cylinder is undesirably ignited during an intake stroke, so that the abnormal combustion, such as a backfire, occurs.

As described above, storing the stop position of internal-combustion engine 101, estimating, on the basis of the stored value, the crank angle and the cylinder of which a piston is at the predetermined piston position after the starting of the engine, and controlling the fuel injection and ignition on the basis of the estimated result make it possible to start the fuel injection and the ignition early, thus improving the starting responsiveness. If, however, the reverse rotation that occurs immediately before the stopping of the engine cannot be accurately determined, then an error occurs in detecting the stop position, so that the fuel injection and the ignition incorrectly performed at a wrong cylinder at the time of the restarting of the engine. This results in a deteriorated exhaust property or the like at the time of the restarting of the engine.

Accordingly, ECU 114 diagnoses whether a rotating direction of the engine on the basis of rotation signal POS is properly determined. Based on the diagnosis result, the crank angle is detected and the fuel injection and the ignition are controlled according to the detected crank angle.

Figure 8A:
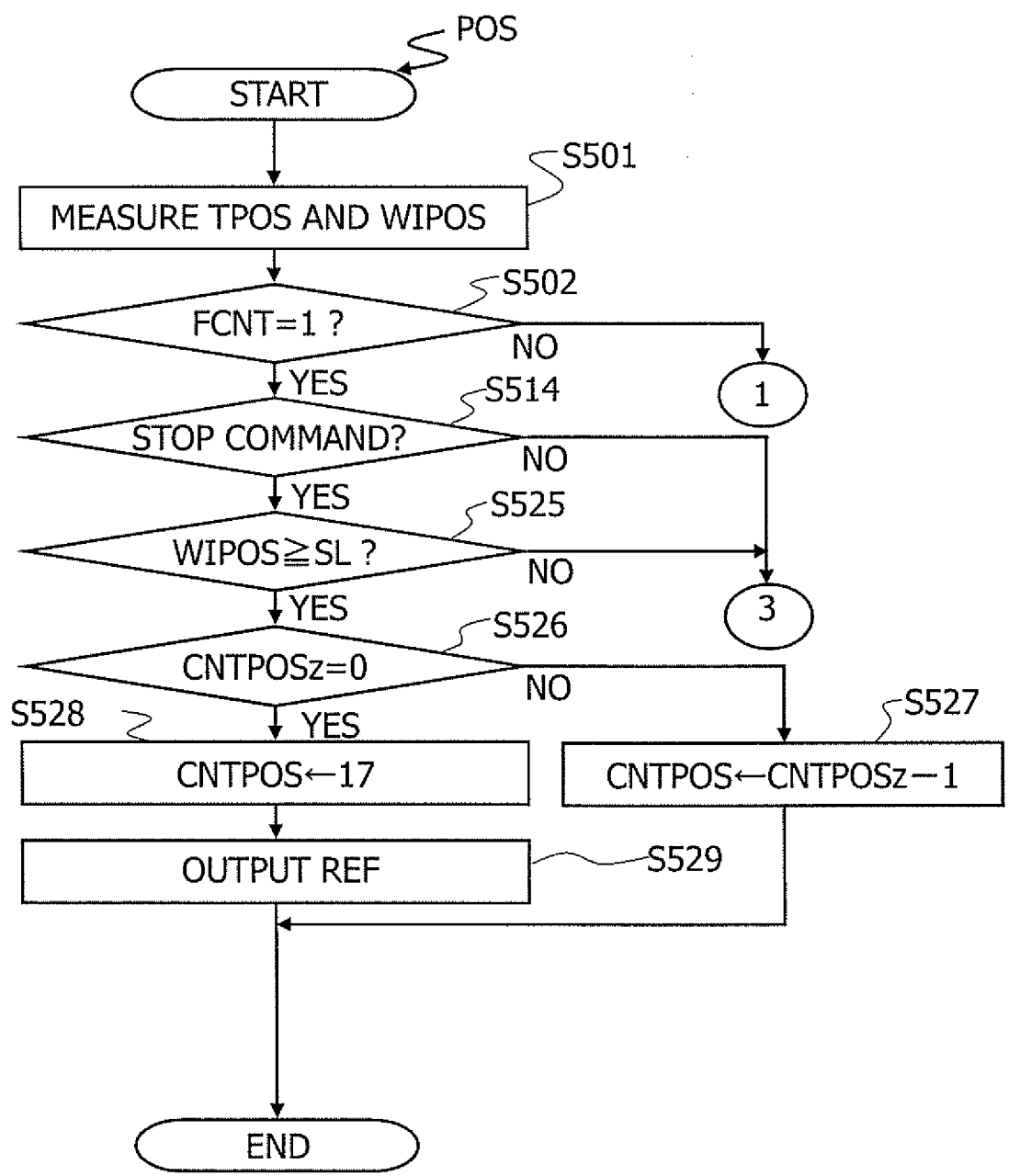
FIG. 8 is a flowchart illustrating the processing for detecting a crank angle, the processing for determining whether the engine is rotated in the forward direction or the reverse direction, and the processing for diagnosing the determination of a rotating direction of the engine in the embodiment.
Figure 8B:
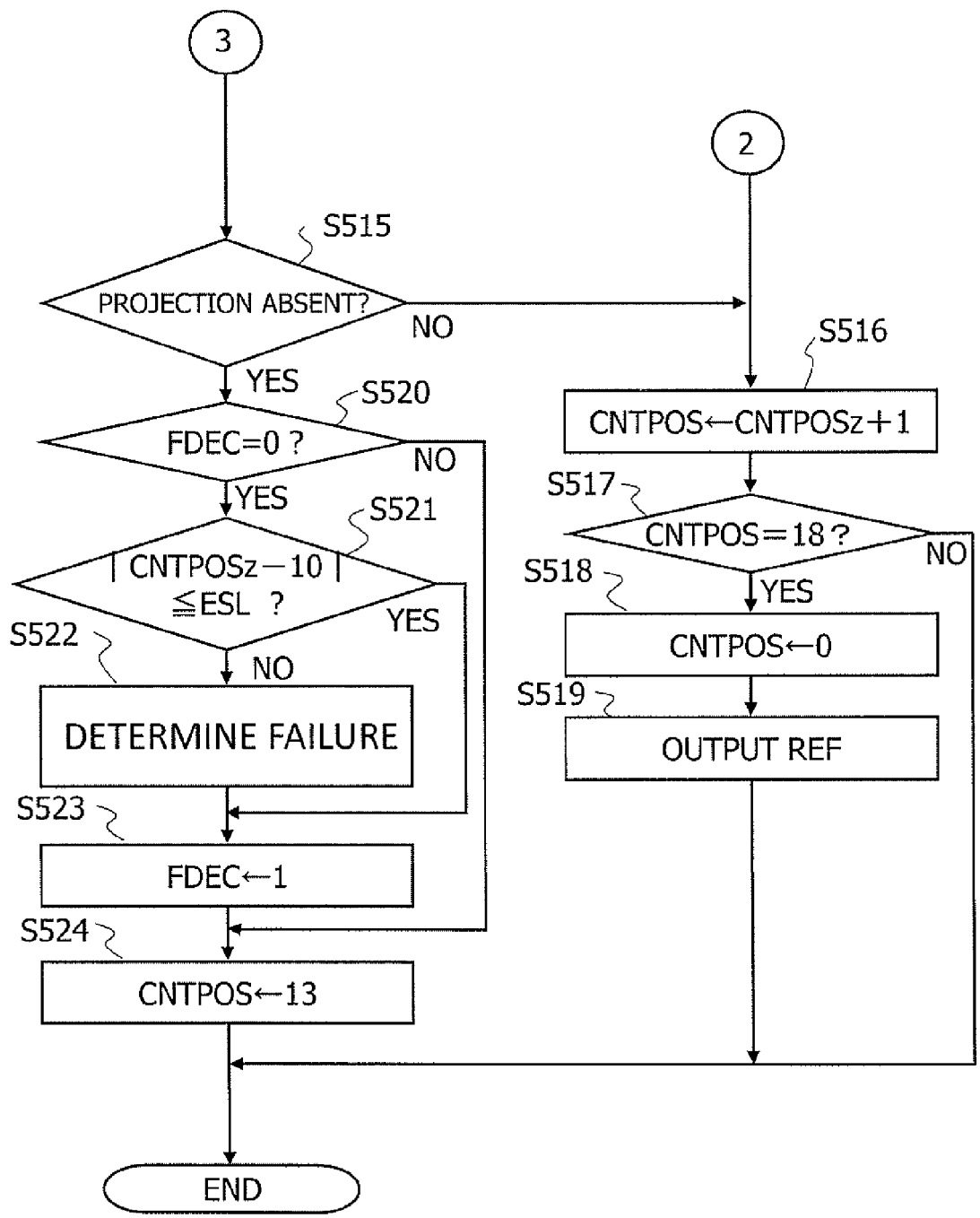
Figure 9A:
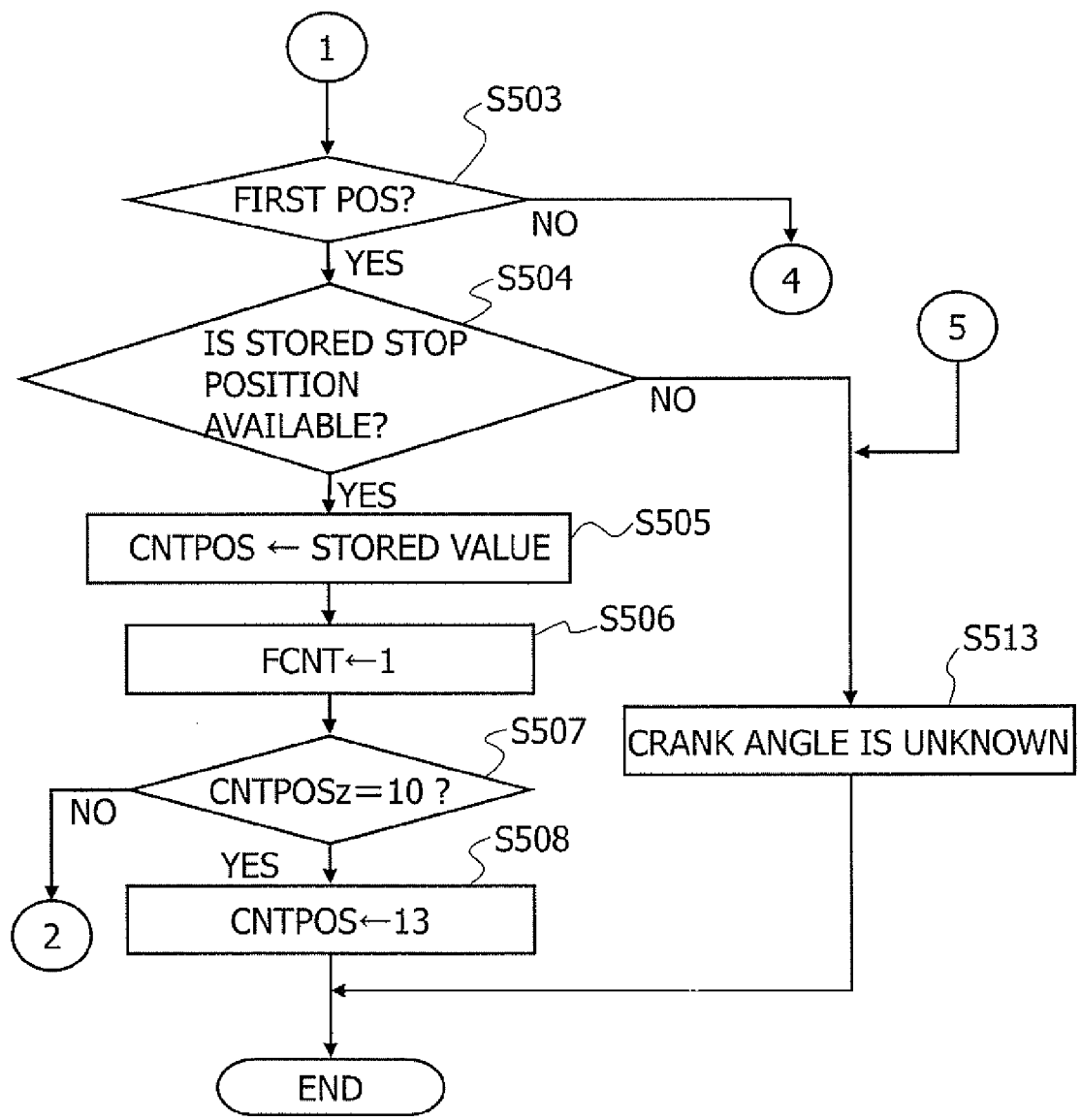
FIG. 9 is another flowchart illustrating the processing for detecting a crank angle, the processing for determining whether the engine is rotated in the forward direction or the reverse direction, and the processing for diagnosing the determination of the rotating direction of the engine in the embodiment.
Figure 9B:
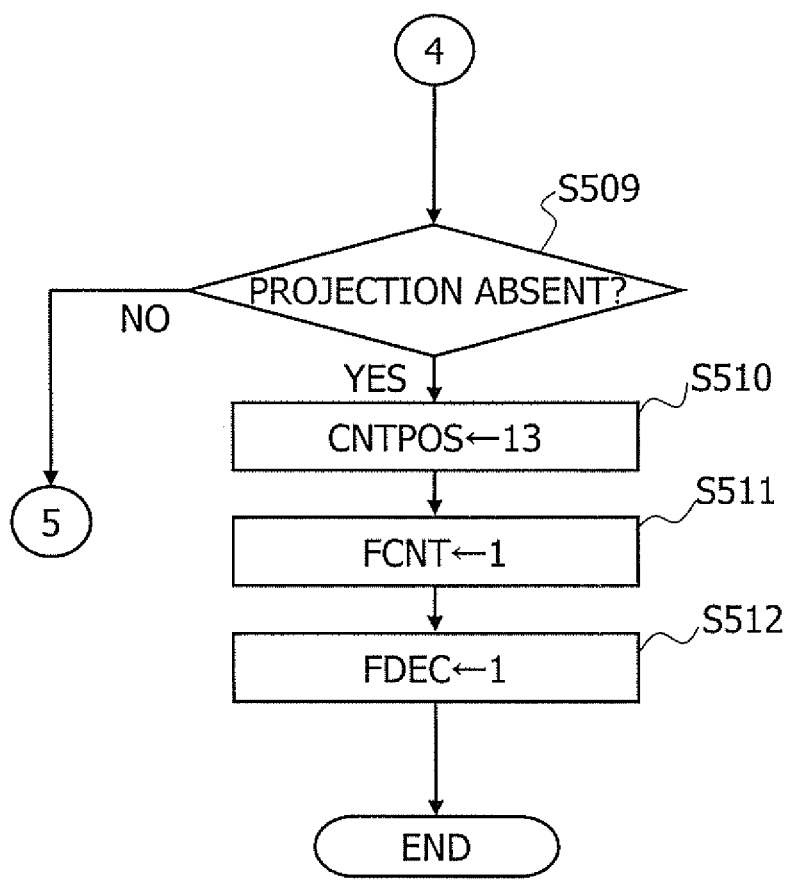

The following will explain in detail the processing for detecting the crank angle, the processing for determining whether crankshaft 120 is rotated the forward direction and the reverse direction, and the processing for diagnosing the determination of the rotating direction of the engine carried out by ECU 114 according to the flowcharts of FIG. 8 and FIG. 9.

The routines illustrated by the flowcharts of FIG. 8 and FIG. 9 are the routines for executing an interrupt when crank angle sensor 117 outputs rotation signal POS.

First, in step S501, a cycle TPOS of rotation signal POS, which is defined as the time period from the output of a previous rotation signal POS to a current rotation signal POS, is measured, and pulse width WIPOS of current rotation signal POS is measured.

In the next step S502, it is determined whether a count start flag FCNT has been set to "0," which is an initial value.

If count start flag FCNT has been set to "0," then the procedure proceeds to step S503. In S503, it is determined whether the current rotation signal POS is the first rotation signal POS after the starting of engine.

If current rotation signal POS is the first rotation signal POS, then the procedure proceeds to step S504. In S504, it is determined whether a value of counter CNTPOSz, which is the count value of rotation signals POS indicating the crank angle when internal-combustion engine 101 stopped last time, has been stored.

If the value of counter CNTPOSz at the time of stopping the engine has not been stored, the angular position of crankshaft 120 at which the current rotation signal POS was output is unclear, and thus, the procedure proceeds to step S513. In S513, it is determined that the crank angle is unclear.

As long as the crank angle remains unclear, the timings for the fuel injection and the ignition cannot be specified. Hence, the fuel injection and the ignition are not started and a standby mode is engaged.

Meanwhile, if the value of counter CNTPOSz at the time when internal-combustion engine 101 was stopped last time has been stored, then it is estimated that the engine operation is started from the position at which the engine was stopped last time, and the procedure proceeds to step S505. In S505, the value of counter CNTPOSz at the previous time when the engine operation was stopped is set to the initial value of counter CNTPOS.

Furthermore, implementing the initial setting of counter CNTPOS allows counter CNTPOS to be updated every time rotation signal POS occurs, so that the crank angle at that time can be detected on the basis of the value of counter CNTPOS. The procedure proceeds to step S506 to set 1 on count start flag FCNT thereby to allow the updating of counter CNTPOS.

Furthermore, in the next step S507, it is determined whether the value of counter CNTPOS at the previous time when the engine operation was stopped is 10.

CNTPOS=10 indicates the value indicative of rotation signal POS output at BTDC 80 degrees. BTDC 80 degrees indicates the position at which rotation signal POS immediately before a projection absent portion is output.

Therefore, if the value of counter CNTPOSz at the time of stopping the engine is 10, then it means that internal-combustion engine 101 is stopped in an angular area in which a projection absent portion of rotation signal POS is located, and it can be estimated that current rotation signal POS occurring due to a forward rotation of internal-combustion engine 101 at the time of restarting the engine by a starter motor is rotation signal POS immediately following a projection absent area.

Thus, in the case in which the value of counter CNTPOSz at the previous time when the engine operation was stopped is 10, the procedure proceeds to step S508 to set 13, which indicates rotation signal POS immediately following the projection absent area, to counter CNTPOS.

Counter CNTPOS=13 corresponds to a 13th rotation signal POS following top dead center TDC in the case in which rotation signals POS are output with no absent projection, i.e., CNTPOS=13 indicates the crank angle position of ATDC 130 degrees.

Meanwhile, if the value of counter CNTPOSz at the previous time when the engine operation was stopped is not 10, the procedure proceeds to step S516 to increase counter CNTPOS, to which the value of counter CNTPOSz at the previous time when the engine operation was stopped has been set as the initial value, by 1.

Previous value CNTPOSz in step S516 will be the value of counter CNTPOSz at the previous time when the engine operation was stopped in the case of rotation signal POS occurring for the first time after the starting of engine or the value updated last time in the case of rotation signal POS occurring for the second time and after.

Subsequently, in the next step S517, it is determined whether the value of counter CNTPOS increased in step S516 is 18, and if not CNTPOS=18, then the routine is immediately terminated.

Meanwhile, if CNTPOS=18, then the procedure proceeds to step S518 to reset the value of counter CNTPOS to zero. Furthermore, in the next step S519, a reference crank angle signal REF is output.

Counter CNTPOS=0 corresponds to the top dead center TDC position of each cylinder. During the time period in which reference crank angle signal REF is being output, i.e., the time period between top dead centers TDC, the number of cam signal PHASE is counted so as to determine the cylinder reaching the compression top dead center.

As described above, counter CNTPOS is reset to zero for each top dead center TDC of each cylinder, so that counter CNTPOS takes a value indicating the rotation angle in the forward direction from top dead center TDC in units of 10 degrees.

If 1 is set on count start flag FCNT in step S506, then the procedure will proceed from step S502 to step S514 when the next rotation signal POS occurs. If the value of counter CNTPOSz at the previous time when the engine operation was stopped has not been stored, then count start flag FCNT is maintained at zero. Therefore, the procedure proceeds step S503 from step S502 when the next rotation signal POS occurs, and if it is determined in step S503 that the rotation signal POS is not the first one, then the procedure proceeds to step S509.

The processing for storing the value of counter CNTPOSz at the time of stopping the engine is carried out only when internal-combustion engine 101 is automatically stopped by the idle reduction control. This is because an automatic restart from the stop state by the idle reduction control requires a higher starting response than that at the time of starting the engine operated by a driver with a key switch. Another reason is that, in the case in which the engine operation is started by the driver with the key switch, the crank angle may have changed while the engine was stopped, and the crank angle position at the time of stopping the engine may be different from the crank angle position immediately before the starting of the engine, so that estimating the crank angle after the starting of the engine on the basis of the crank angle at the time of stopping the engine may result in a false estimation.

In step S509, the previous value and the current value of cycle TPOS of rotation signal POS are compared with each other to thereby determine whether the current rotation signal POS corresponds to the first rotation signal POS after the projection absent area.

Cycle TPOS suddenly increases at a projection absent portion in which rotation signal POS is to be output at intervals of 30 degrees crank angle. Accordingly, if a significant cycle change that exceeds a change in cycle TPOS attributable to a change in rotating speed takes place, then it can be determined that the significant cycle change indicates the result of measurement of the portion at a 30 degrees interval (the projection absent portion) has been obtained in the current cycle TPOS.

Furthermore, if the current rotation signal POS corresponds to the first rotation signal POS after the projection absent area, then the position at 50 degrees before the top dead center (BTDC50degrees) has been detected on the basis of rotation signal POS. In this case, the procedure proceeds to step S510 to set 13 which corresponds to ATDC130degrees (BTDC50degrees), on counter CNTPOS.

In next step S511, 1 is set on count start flag FCNT, and furthermore, in step S512, 1 is set on a crank angle decision flag FDEC.

Crank angle decision flag FDEC holds zero, which is the initial value, if 1 is set on count start flag FCNT on the basis of the value of counter CNTPOSz at the previous time when the engine operation was stopped and the updating of counter CNTPOS is started, while it sets 1 if counter CNTPOSz at the previous time when the engine operation was stopped has not been stored and the updating of counter CNTPOS is started after the first rotation signal POS after the projection absent area is detected.

If it is determined in step S509 that the current rotation signal POS does not correspond to the first rotation signal POS after the projection absent area, then the procedure proceeds to step S513 to decide that the crank angle is unclear.

More specifically, if counter CNTPOSz at the previous time when the engine operation was stopped has not been stored, then a detection result indicating that the crank angle is unclear, is output until the first rotation signal POS after the projection absent area is detected. When the first rotation signal POS after the projection absent area is detected, it can be determined that the crank angle is ATDC130degrees (BTDC50degrees) at that point, so that the updating of counter CNTPOS will be started from next time.

Accordingly, in the case in which counter CNTPOSz at the previous time when the engine operation was stopped has not been stored, the crank angle remains unclear until the first rotation signal POS after the projection absent area is detected, so that the fuel injection and the ignition can be started after the first rotation signal POS after the projection absent area is detected.

Meanwhile, if counter CNTPOSz at the previous time when the engine operation was stopped has been stored, then the stored value is set as the initial value of counter CNTPOS and the updating of counter CNTPOS is immediately begun, thereby causing the crank angle after the starting of engine to be estimated on the basis of counter CNTPOSz at the previous time when the engine operation was stopped. This permits early start of the fuel injection and the ignition.

When 1 is set on count start flag FCNT, the procedure proceeds to step S514 from step S502. In step S514, it is determined whether a command to stop internal-combustion engine 101 has occurred, more specifically, whether the fuel injection and the ignition have been stopped.

In the case in which the processing for storing counter CNTPOSz at the time of stopping the engine is carried out only when the engine is automatically stopped by the idle reduction control, the aforesaid stop command can be restricted to the automatic stop by the idle reduction control.

If the stop command has not occurred and internal-combustion engine 101, in which the fuel injection and the ignition are being continued, is in operation, then the procedure proceeds to step S515.

In step S515, similarly to step S509, the previous value and the current value of cycle TPOS of rotation signal POS are compared with each other to thereby determine whether the current rotation signal POS corresponds to the first rotation signal POS after the projection absent area.

If the current rotation signal POS is not the first rotation signal POS after the projection absent area, then the procedure proceeds to step S516 to increase the previous counter CNTPOS by 1 and set the increased value as the current value.

Subsequently, in the next step S517, it is determined whether the value of counter CNTPOS increased in step S516 is 18, and if not CNTPOS=18, then the routine is immediately terminated.

Meanwhile, if CNTPOS=18, then the procedure proceeds to step S518 to reset the value of counter CNTPOS to zero, and furthermore, in the next step S519, reference crank angle signal REF is output.

Furthermore, if it is determined in step S515 that the current rotation signal POS is the first rotation signal POS after the projection absent area, then the procedure proceeds to step S520.

In step S520, it is determined whether 1 has been set on crank angle decision flag FDEC.

If zero has been set on crank angle decision flag FDEC, i.e., if counter CNTPOSz when internal-combustion engine 101 was stopped has been stored and counter CNTPOS has been counted up after the starting of the engine on the basis of the stored value, then the procedure proceeds to step S521.

In step S521, it is determined whether the value of the previous counter CNTPOSz, i.e., the value obtained by the count-up, using counter CNTPOSz at the previous time when the engine operation was stopped as the initial value, is in the vicinity of 10.

If counter CNTPOS has been properly counted up, then the count-up result of counter CNTPOS should be 10 when rotation signal POS is output immediately before the projection absent area, because counter CNTPOS before the count-up processing at the time point when the first rotation signal POS is output after the tooth missing area should normally indicate 10.

However, a failure to correctly determine the reverse rotation taking place when internal-combustion engine 101 stops prevents the value of counter CNTPOS from corresponding to the actual crank angle at the time of stopping the engine. If, therefore, the count-up of counter CNTPOS is begun at the time of restarting the engine, using counter CNTPOSz at the time of stopping the engine as the initial value, then the crank angle at the time of starting the engine will be falsely detected.

If a projection absent in rotation signal POS appears at a certain crank angle and cranking is started by a starter motor, then the crankshaft 120 will not rotate in the reverse direction but continue to rotate in the forward direction from the stop position. Hence, the crank angle will be determined at the time point when an absent projection in rotation signal POS is detected for the first time after internal-combustion engine 101 is started up.

Thus, if the value of counter CNTPOS at the time point when the absent projection in rotation signal POS is detected, i.e., an estimated crank angle based on the position at the time of stopping the engine, is not 10, which corresponds to the position of the absent projection, then it can be determined that the incorrect determination of the reverse rotation immediately before the stopping of the engine has caused the crank angle at the time of stopping the engine to be incorrectly detected, and the crank angle estimated on the basis of the crank angle at the time of stopping the engine is different from an actual crank angle.

However, in the processing for increasing or decreasing counter CNTPOS on the basis of the determination whether the engine is rotated in the forward direction or the reverse direction, even if the determination of the rotating direction of the engine is correctly accomplished, there may be a small error in detecting the crank angle due to the reversing timing of the rotating direction.

For the reason described above, it is determined in step S521 whether the absolute value of the difference between the previous counter CNTPOSz and 10 which is the expected value, is equal to or less than an allowable value ESL (e.g., 1 to 3).

The allowable value ESL is set on the basis of an angle such that an error in the stop position of internal-combustion engine 101 will occur even in a state in which whether the engine is rotated in the forward direction or the reverse direction is accurately determined, and adjusted and stored beforehand such that the difference between the previous counter CNTPOSz and the expected value exceeds allowable value ESL when incorrect determination of the rotating direction of the engine occurs.

If the absolute value of the difference between the previous counter CNTPOSz and 10, which is the expected value, exceeds allowable value ESL, then it is presumed that a failure to correctly determine the reverse rotation immediately before the stopping of internal-combustion engine 101 has led to incorrect detection of the crank angle when internal-combustion engine 101 stopped, and the incorrect stop position has been used as the initial value to detect the crank angle by counting up counter CNTPOS after the restarting of the engine, thus causing the value of counter CNTPOS to fail to match the value corresponding to a projection absent portion when the projection absent portion of rotation signal POS was detected for the first time after the starting of the engine.

Accordingly, if the absolute value of the difference between the previous counter CNTPOSz and 10, which is the expected value, exceeds allowable value ESL, then it is determined that abnormality occurs in the determination of the rotating direction of the engine, i.e., the reverse rotation cannot be accurately determined. The procedure proceeds to step S522 to warn the driver of the vehicle about the occurrence of the abnormality so as to prompt the driver to quickly repair it and carries out control for eliminating the abnormality (failure processing).

The result of the diagnosis of the abnormality may be retained until the absolute value of the difference between the previous counter CNTPOSz and 10 which is the expected value, is determined to be equal to the allowable value or less in step S521, or may be forcibly reset during a repair or adjustment work at a maintenance factory.

The warning to the driver is performed by, for example, turning on a warning lamp 171 provided around the driver's seat of the vehicle, or the occurrence of the abnormality can be informed to the driver by vocal guidance or the like.

Furthermore, the failure processing is capable of prohibiting the determination of the fuel injection and ignition timings based on the estimation result of the crank angle using the crank angle at the time of stopping the engine as the initial value, or prohibiting the idle reduction control. This will be explained in more detail hereinafter.

Meanwhile, if it is determined in step S521 that the absolute value of the difference between the previous counter CNTPOSz and 10, which is the expected value, is equal to or less than an allowable value ESL, then it is determined that the function for determining whether the engine is rotated in the forward direction or the reverse direction is normal and the reverse rotation immediately before the stopping of internal-combustion engine 101 has correctly been determined, and the procedure proceed to step S523, bypassing step S522.

In step S523, 1 is set on crank angle decision flag FDEC on the basis of the detection of the current projection absent area.

Furthermore, 13, which is the value corresponding to the first rotation signal POS after the projection absent area, is set on counter CNTPOS in step S524.

Furthermore, if it is determined in step S520 that 1 has been set on crank angle decision flag FDEC, i.e., if the projection absent area has already detected last time or earlier and the detection of the current projection absent area is the second or later one after the restarting of the engine, and it has been possible to detect the crank angle on the basis of the projection absent area of rotation signal POS after the starting of the engine, then the procedure bypasses step S521 to step S523 and proceeds to step S524 to set 13 on counter CNTPOS.

Furthermore, if the occurrence of the command to stop internal-combustion engine 101 (the occurrence of the stop command by the idle reduction control) is determined in step S514, then the procedure proceeds to step S525.

In step S525, pulse width WIPOS of rotation signal POS and threshold value SL are compared, and if pulse width WIPOS is equal to or greater than threshold value SL, then it is determined that crankshaft 120 is rotated in the reverse direction, or if pulse width WIPOS is lower than threshold value SL, then it is determined that crankshaft 120 is rotated in the forward direction.

When crankshaft 120 is in a forward rotation mode, the procedure proceeds to step S515 to count up counter CNTPOS each time rotation signal POS occurs, and when counter CNTPOS reaches 18, the procedure resets it to zero. This processing is repeated.

Meanwhile, if it is determined that crankshaft 120 is rotated in the reverse direction, then the procedure proceeds to step S526 to determine whether the previous value CNTPOSz of counter CNTPOS is zero.

Furthermore, if the previous value CNTPOSz is not zero, then the procedure proceeds to step S527 to decrease the value of counter CNTPOS by 1 from the previous value CNTPOSz so as to deal with the return of the crank angle caused by the reverse rotation, then the routine is immediately terminated.

However, if the previous value CNTPOSz is 13 when the procedure proceeds to step S527, then it is determined that the current rotation signal POS is rotation signal POS immediately before a projection absent area, and the counter CNTPOS is set to 10 in step S527.

Furthermore, if the previous value CNTPOSz is zero, then the procedure proceeds to step S528 to reset the value of counter CNTPOS to 17 which is the value immediately before counter CNTPOS is reset to zero in the forward rotation mode.

More specifically, when crankshaft 120 is in the forward rotation mode, counter CNTPOS changes in the manner of . . . 17→0→1→2 . . . →17→0→ . . ., so that counter CNTPOS is changed from 0 to 17 in steps in a reverse rotation mode and counting down from 17 is carried out each time rotation signal POS occurs.

In step S529, reference crank angle signal REF is output.

The processing for determining whether the engine is rotated in the forward direction or the reverse direction when the stop command occurs and updating counter CNTPOS, which is indicated by step S514, step S525 to step S529, and steps S515 to 524 corresponds to the processing for detecting a stop position. While internal-combustion engine 101 is stopped by the idle reduction control, the supply of power to ECU 114 continues and ECU 114 stores and retains counter CNTPOS updated until immediately before the stopping of the engine as data indicating the crank angle at the time of stopping of the engine.

The value of counter CNTPOS when internal-combustion engine 101 is stopped can be stored in a non-volatile memory.

The failure processing for the case in which the abnormality occurs in the determination whether the engine is rotated in the forward direction or the reverse direction, i.e., the specific processing details in step S522 mentioned above, will now be explained according to the flowchart of FIG. 10.

Figure 10:
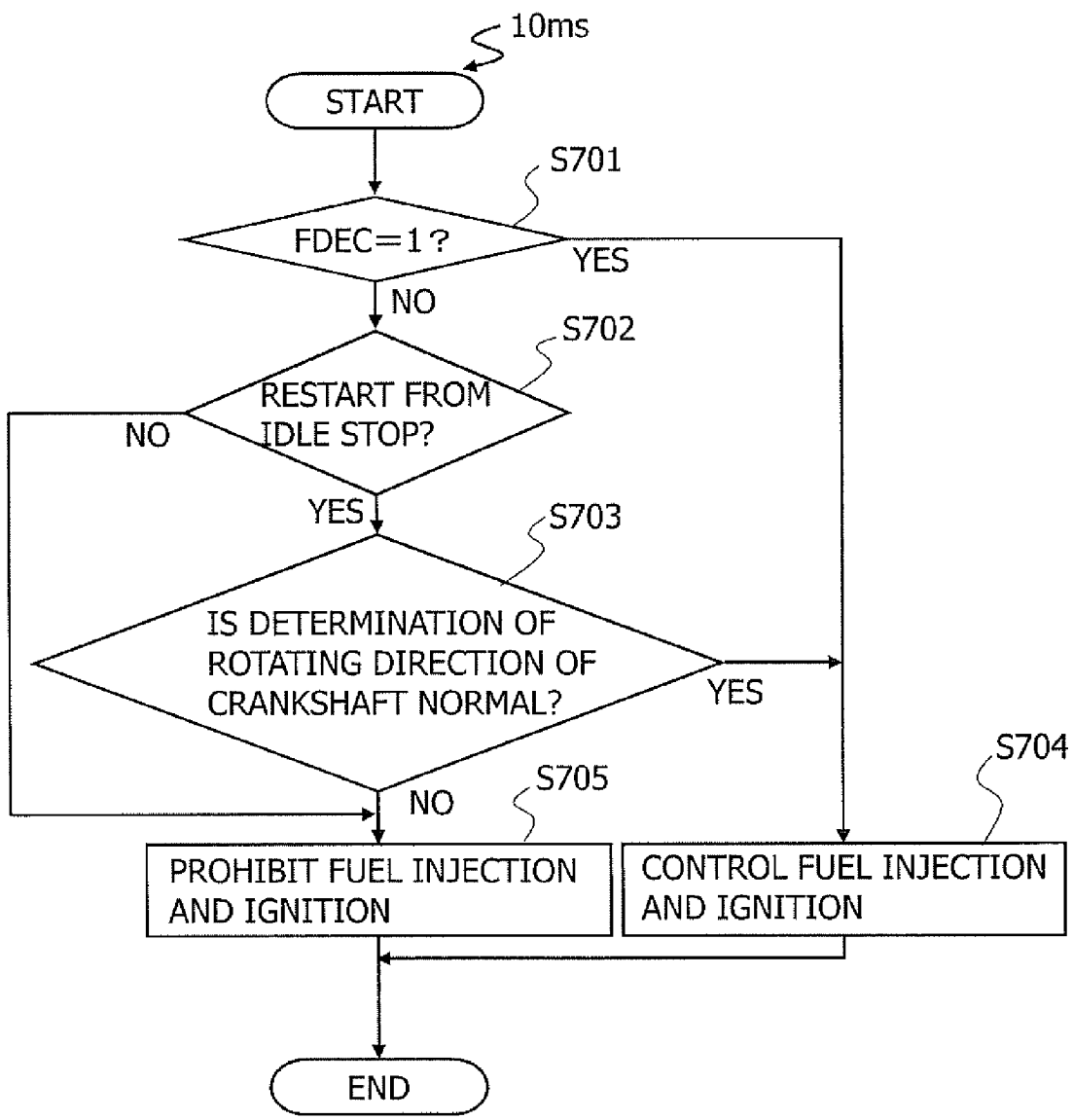
FIG. 10 is a flowchart illustrating the fuel injection and ignition control in an abnormal state of the determination of the rotating direction of the engine in the embodiment.

The flowchart of FIG. 10 indicates a routine carried out by ECU 114 to execute an interrupt for each predetermined time (e.g., 10 ms). First, in step S701, it is determined whether crank angle decision flag FDEC is 1 or not.

If crank angle decision flag FDEC is 1, then the projection absent area of rotation signal POS is detected after the starting of engine. The counting of rotation signal POS (counter CNTPOS) based on the projection absent area allows the crank angle to be determined, so that the procedure proceeds to step S704 to determine the timings of the fuel injection and the ignition on the basis of counter CNTPOS and implement the fuel injection and the ignition.

Meanwhile, if crank angle decision flag FDEC is zero, the projection absent area has not yet been detected since the starting of the engine, and the crank angle cannot be determined, the procedure proceeds to step S702.

In step S702, it is determined whether the restart is an automatic restart of internal-combustion engine 101 by the idle reduction control.

If internal-combustion engine 101 is started by the driver operating the key (manually started), then the request for the starting responsiveness is lower than that of the automatic restart of internal-combustion engine 101 by the idle reduction control. Hence, adequate starting responsiveness can be obtained even when the fuel injection and the ignition are started after the projection absent area in rotation signal POS is detected since cranking is started.

Thus, in the case in which internal-combustion engine 101 is started by the driver operating the key rather than the automatic restart of internal-combustion engine 101 by the idle reduction control, the procedure proceeds to step S705 to prohibit the fuel injection and the ignition from being decided.

More specifically, when internal-combustion engine 101 is started by the driver operating the key, the timings of the fuel injection and the ignition are decided on the basis of counter CNTPOS and the fuel injection and the ignition are implemented in step S704 after the projection absent area in rotation signal POS is detected since the engine is started so as to allow the crank angle to be determined on the basis of the count (counter CNTPOS) of rotation signal POS based on the projection absent area, that is, after crank angle decision flag FDEC becomes 1.

Meanwhile, if in step S702, the automatic restart of internal-combustion engine 101 by the idle reduction control is determined, then the procedure proceeds to step S703.

In step S703, it is determined whether the determination of the rotating direction of crankshaft 120 on the basis of pulse width WIPOS of rotation signal POS is normal or abnormal.

If the forward rotation and the reverse rotation of crankshaft 120 can be correctly determined, then the crank angle at the time of stopping of internal-combustion engine 101 can be accurately detected on the basis of the determination of the rotating direction, and the accurate detection of the crank angle makes it possible to correctly detect the cylinder of which a piston is at the predetermined piston position at the time of stopping the engine. Hence, during the period of time from the startup to the detection of the projection absent area of rotation signal POS, the crank angle and the cylinder of which a piston is at the predetermined piston position can be accurately estimated on the basis of the information on the position at the time of stopping the engine and the fuel injection and the ignition can be started early, thus permitting improved starting responsiveness.

If it is determined in step S703 that the rotating direction of crankshaft 120 can be properly determined, then the procedure proceeds to step S704. In S704, the fuel injection and the ignition is performed before the detection of the projection absent area on the basis of the result of estimating the crank angle after the starting of engine by using the crank angle at the time of stopping the engine as the initial value and also on the basis of the cylinder of which piston is estimated to have reached the predetermined piston position after the starting of the engine by using the cylinder of which a piston is at the predetermined piston position at the time of stopping the engine as the reference.

Meanwhile, if the determination whether crankshaft 120 is rotated in the forward direction or the reverse direction is abnormal and thus, there is a possibility that the rotating direction of crankshaft 120 is incorrectly determined, then the accuracy of the detection of the crank angle and the cylinder of which a piston is at the predetermined piston position when internal-combustion engine 101 stops deteriorates. Hence, if the crank angle and the cylinder of which a piston is at the predetermined piston position after the starting of the engine are estimated by using the crank angle and the cylinder of which a piston is at the predetermined piston position at the time of stopping the engine as the initial values, then determination of the crank angle and the cylinder of which a piston is at the predetermined piston position are incorrectly determined.

If the fuel injection and the ignition are controlled on the basis of the incorrect crank angle and cylinder of which a piston is at the predetermined piston position, then the fuel injection and the ignition will be undesirably carried out at timings different from expected timings and on a wrong cylinder. This will cause abnormal combustion (afterburning, backfire or the like), resulting in deteriorated exhaust property or starting performance.

Therefore, if the determination of the rotating direction of crankshaft 120 is abnormal, then the procedure proceeds to step S705 to prohibit the control of the fuel injection and the ignition. Thus, if the determination of the rotating direction is abnormal, then even for the automatic restart of internal-combustion engine 101 by the idle reduction control, the procedure does not proceed to step S704 until the projection absent area in rotation signal POS is detected after the starting of the engine, the crank angle is determined and the crank angle decision flag FDEC is set to 1, similar to the case in which internal-combustion engine 101 is started by the driver operating the key. The fuel injection and the ignition are carried out after the crank angle is determined and the cylinder of which a piston is at the predetermined piston position is determined by the count of rotation signal POS (counter CNTPOS) based on the projection absent area.

The aforesaid arrangement makes it possible to restrain abnormal combustion caused by carrying out the fuel injection and the ignition on a wrong cylinder or at wrong timings, although the start of the fuel injection and the ignition at the automatic restart of internal-combustion engine 101 by the idle reduction control will be delayed with resultant deteriorated starting responsiveness.

If it is determined in step S703 that the determination of the rotating direction is abnormal and the procedure proceeds to step S705, then the fuel injection and the ignition at the timings already decided before the determination is abnormal will be cancelled.

Figure 11:
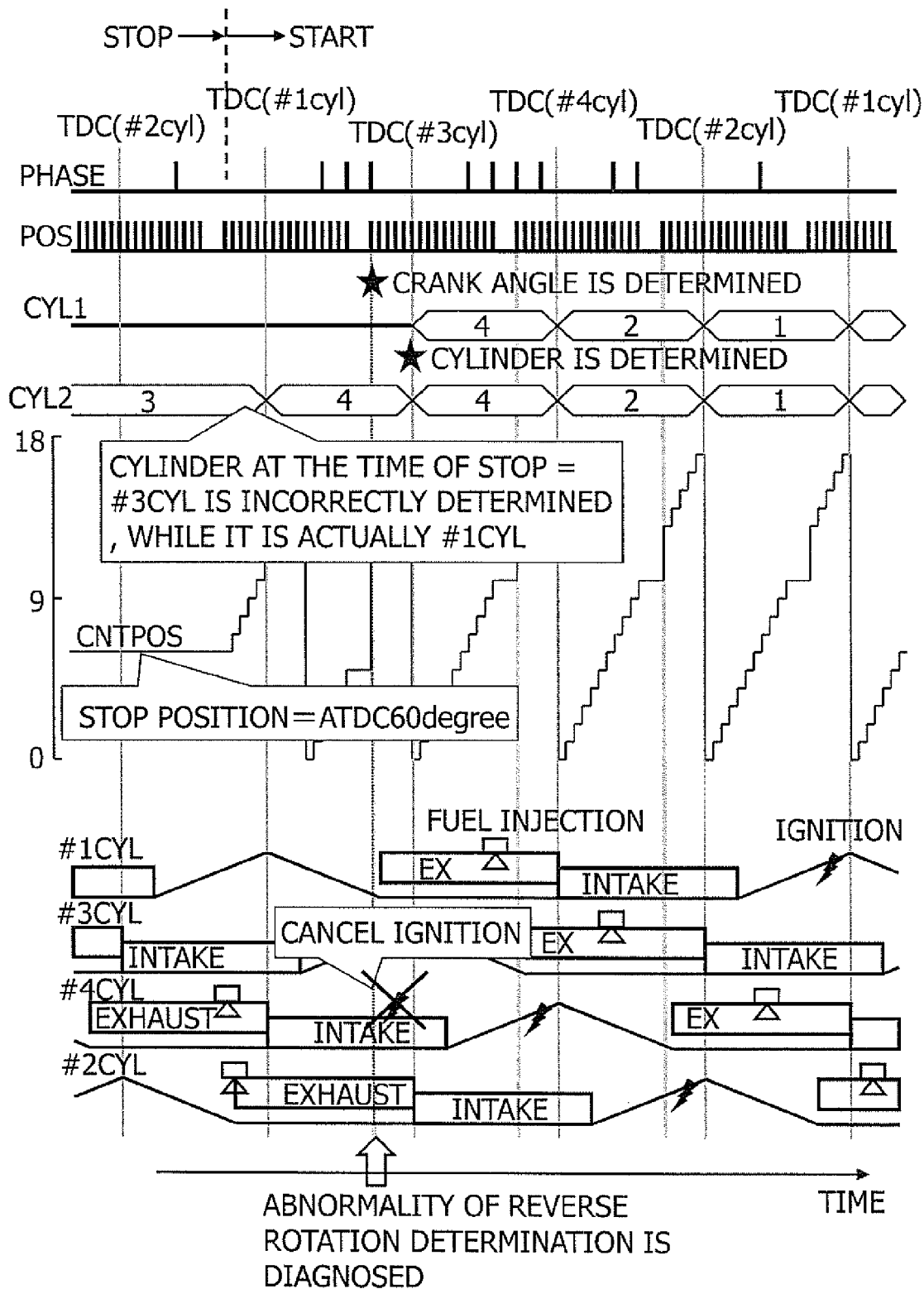
FIG. 11 is a time chart illustrating the processing for diagnosing the determination of the rotating direction of the engine in the embodiment.

FIG. 11 illustrates the timing for diagnosing the abnormality of determining the reverse rotation and the processing for cancelling the ignition based on the diagnosis in the case in which the abnormality to determine the reverse rotation when internal-combustion engine 101 has actually stopped before the compression top dead center of the first cylinder, so that it has been incorrectly detected that internal-combustion engine 101 has stopped before the compression top dead center of the third cylinder, similar to the example illustrated in FIG. 7.

In the example illustrated in FIG. 11, based on the memory that internal-combustion engine 101 has stopped before the compression top dead center of the third cylinder, the fuel is injected into the fourth cylinder and the second cylinder at the time of restarting the engine and counter CNTPOS is counted up after the starting of engine, taking 6, which is the value of counter CNTPOS at the time of stopping the engine, as the initial value.

In this case, the value of counter CNTPOS at the time point when the projection absent area in rotation signal POS is 5 rather than 10, which would be ideal, so that it is determined that the value counter CNTPOS did not accurately indicate an actual crank angle due to the failure to accurately determine the reverse rotation immediately before the stopping of the engine, and the abnormality of the reverse rotation determining function is determined.

Furthermore, the time point at which the abnormality was determined is before the ignition timing for the fourth cylinder set on the basis of the incorrect determination of the stop position. Based on the incorrect determination, therefore, the ignition on the fourth cylinder is cancelled so as to prevent the occurrence of a backfire attributable to ignition during an intake stroke.

The time point at which the abnormality of the reverse rotation determining function is determined is also the timing at which the crank angle is determined. After that, therefore, the fuel injection and the ignition can be accurately controlled, and the fuel injected to the fourth cylinder and the second cylinder at the time of starting the engine is ignited and burnt at the timing immediately before the compression top dead center of each cylinder.

In the case in which an abnormality takes place in determining whether the engine is rotated in the forward direction or the reverse direction, as described above, when the engine is restarted by the idle reduction control, the control of the fuel injection and the ignition on the basis of the result of the estimation of the crank angle by using the crank angle at the time of stopping the engine as the initial value can be prohibited, and the idle reduction control can be prohibited.

Figure 12:
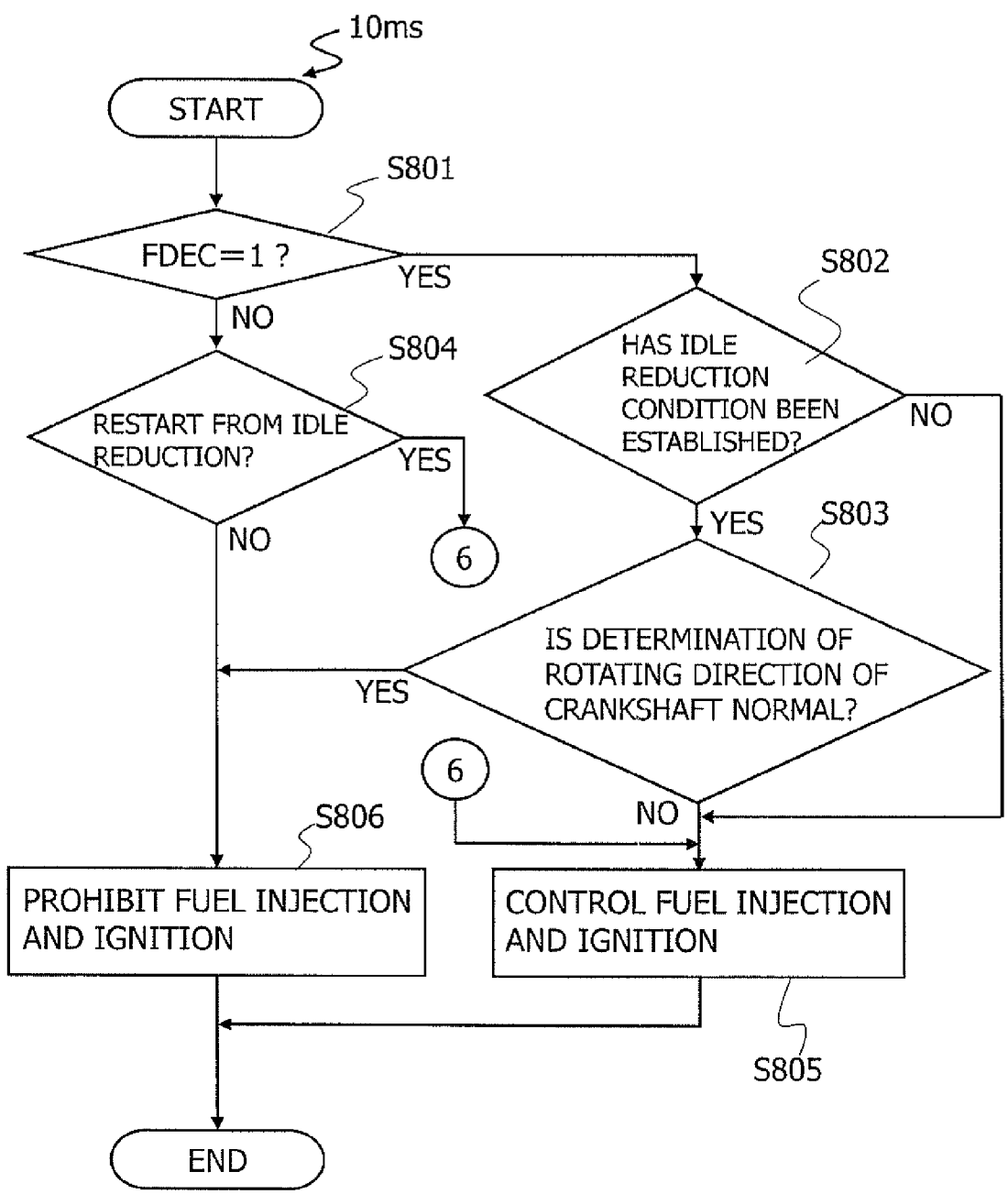
FIG. 12 is a flowchart illustrating the fuel injection and ignition control in an abnormal state of the determination of the rotating direction of the engine in the embodiment.

The flowchart of FIG. 12 illustrates the processing by ECU 114 to prohibit the idle reduction control in the case in which an abnormality in determining the rotating direction has occurred.

The flowchart of FIG. 12 illustrates the routine carried out by ECU 114 to execute an interrupt for each predetermined time (e.g., 10 ms). First, in step S801, it is determined whether crank angle decision flag FDEC is 1.

If crank angle decision flag FDEC is 1, then the procedure proceeds to step S802 to determine whether the condition for automatically stopping internal-combustion engine 101 by the idle reduction control is established.

If the condition for automatically stopping internal-combustion engine 101 by the idle reduction control has been established, then the procedure proceeds to step S803 to determine whether the determination of the rotating direction of crankshaft 120 on the basis of pulse width WIPOS of rotation signal POS is normal or abnormal.

If the determination of the rotating direction can be normally accomplished, then the procedure proceeds to step S806 to stop the fuel injection and the ignition, thereby automatically stopping the operation of internal-combustion engine 101.

When internal-combustion engine 101 rotates in the reverse direction immediately before the stopping of the engine, the reverse rotation of crankshaft 120 can be accurately detected on the basis of pulse width WIPOS of rotation signal POS, making it possible to substantially accurately detect the crank angle and the cylinder of which a piston is at the predetermined piston position at the time of stopping the engine. Thus, when automatically restarting internal-combustion engine 101, estimating the crank angle by using the crank angle at the time of stopping the engine as the initial value and estimating the cylinder of which a piston is at the predetermined piston position on the basis of the cylinder of which a piston is reached the predetermined piston position at the time of stopping the engine make it possible to substantially accurately determine the crank angle and the cylinder of which a piston is at the predetermined piston position at that point before the projection absent area in rotation signal POS is detected after the starting of the engine and to accurately decide the timings for the fuel injection and the ignition, thus allowing the fuel injection and the ignition to be started early.

In other words, the crank angle at the time of stopping the engine can be detected substantially accurately and the fuel injection and the ignition based thereon can be started early at the time of restarting the engine, thus the automatic stop of internal-combustion engine 101 by the idle reduction control is allowed.

Meanwhile, in the case in which an abnormality of the determination of the rotating direction occurs and it cannot be accurately determined whether the engine is rotated in the forward direction or the reverse direction, if internal-combustion engine 101 rotates in the reverse direction immediately before the stopping of the engine, then an error occurs in the result of the detection of the crank angle at the time of stopping the engine.

Accordingly, in the case in which the abnormality of the determination of the rotating direction of the engine occurs, deciding the timings for the fuel injection and the ignition on the basis of the crank angle estimated by using the crank angle at the time of stopping the engine as the initial value may lead to the occurrence of abnormal combustion even though the fuel injection and the ignition could be started early. On the other hand, delaying the start of the fuel injection and the ignition until the projection absent area in rotation signal POS is detected for the first time at the time of restarting the engine inconveniently deteriorate the starting responsiveness due to the delayed start of the fuel injection and the ignition while the occurrence of the abnormal combustion can be restrained.

Therefore, in the case in which the abnormality of the determination of the rotating direction occurs, even if the condition for automatically stopping internal-combustion engine 101 by the idle reduction control is established, the procedure proceeds to step S805 to subsequently implement the fuel injection and the ignition, thus continuing the operation of internal-combustion engine 101 without automatically stopping internal-combustion engine 101.

If it is determined in step S802 that the condition for automatically stopping internal-combustion engine 101 by the idle reduction control is not established, i.e., if the operation of internal-combustion engine 101 is required to be continued, then the procedure proceeds to step S805 to subsequently implement the fuel injection and the ignition.

Furthermore, if it is determined in step S801 that crank angle decision flag FDEC is zero, i.e., during the period of time from the startup to the moment the projection absent area in rotation signal POS is detected, the procedure proceeds to step S804 to determine whether the engine is restarted from the automatic stop state of internal-combustion engine 101 set by the idle reduction control.

If the determination result indicates the restart by the idle reduction control, then the procedure proceeds to step S805 to carry out the fuel injection and the ignition on the basis of the crank angle and the cylinder of which a piston is at the predetermined piston position estimated by using the crank angle and the predetermined piston position at the time of stopping the engine as the initial values.

The reverse rotation can be accurately detected, and therefore, the idle reduction control is carried out in the state in which a stop position is accurately detected, thus making it possible to accurately estimate the crank angle and the cylinder of which a piston is at the predetermined piston position immediately after the starting of the engine on the basis of the stop position when the engine is restarted by the idle reduction control. This arrangement allows the fuel injection and the ignition to be accurately controlled, so that the fuel injection and the ignition are carried out before the projection absent area in rotation signal POS is detected to determine the crank angle and the cylinder of which a piston is at the predetermined piston position.

Meanwhile, in the case in which the engine is started by the key operated by the driver rather than by the idle reduction control, required adequate starting responsiveness can be obtained even when the projection absent area in rotation signal POS is detected to determine the crank angle and the cylinder of which a piston is at the predetermined piston position and then the fuel injection and the ignition are started. Hence, the procedure proceeds from step S804 to step S806 to prohibit the fuel injection and the ignition. Then, the fuel injection and the ignition are started after the crank angle and the cylinder of which a piston is at the predetermined piston position are determined.

In the case in which the idle reduction control has been prohibited because of the occurrence of the abnormality of determination of the rotating direction, the state in which the idle reduction control has been prohibited is preferably notified to the driver by, for example, turning a warning lamp on.

In the embodiment described above, at the time point when the abnormality of the determination of the rotating direction is determined for the first time, the warning operation, such as turning the warning lamp on, has immediately been performed and the failure processing for coping with the abnormality has been carried out. Alternatively, however, the abnormality may be determined and the warning lamp may be turned on if the abnormality of the determination of the rotating direction is continuously diagnosed.

Furthermore, the pulse width of rotation signal POS may be detected under a condition in which internal-combustion engine 101 (crankshaft 120) rotates in the forward direction (e.g., during cranking or in a state in which the rotational speed of the engine has increased), thereby diagnosing the abnormality of the determination of the rotating direction by an abnormal pulse width. In this case also, the control of the fuel injection and the ignition on the basis of the crank angle determined by using the crank angle, which was obtained at the time when the engine is stopped, as the initial value can be prohibited, or the idle reduction control can be prohibited.

The entire contents of Japanese Patent Application No. 2010-016295 filed on Jan. 28, 2010, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A control apparatus for an internal-combustion engine, comprising:
    a forward and reverse rotation determining unit which determines whether a crankshaft of the internal-combustion engine is rotated in a forward direction or a reverse direction;
    a stop position detecting unit which detects a crank angle at a time of stopping the internal-combustion engine on the basis of the determination of a rotating direction by the forward and reverse rotation determining unit;
    a diagnosing unit which compares a crank angle estimated on the basis of the crank angle at the time of stopping the internal-combustion engine detected by the stop position detecting unit and a crank angle detected after the internal-combustion engine is started to thereby determine whether the forward and reverse rotation determining unit is abnormal or not;
    an idle reduction control unit which automatically stops the internal-combustion engine in a case in which a preset stop condition is established and which automatically restarts the internal-combustion engine in a case in which a preset restart condition is established; and
    a control prohibiting unit which prohibits the idle reduction control unit from automatically stopping the internal-combustion engine on the basis of the crank angle which is estimated on the basis of the crank angle at the time of stopping the internal-combustion engine in a case in which the diagnosing unit determines that the forward and reverse rotation determining unit is abnormal.

2. The control apparatus for the internal-combustion engine according to claim 1, wherein
    the forward and reverse rotation determining unit determines whether the crankshaft is rotated in the forward direction or the reverse direction on the basis of a rotation signal which is output for each unit angle of the crankshaft and differs according to the rotating direction of the crankshaft, and
    the stop position detecting unit counts the rotation signal according to the determination of the rotating direction of the crankshaft so as to detect the crank angle at the time of stopping the internal-combustion engine.

3. The control apparatus for the internal-combustion engine according to claim 2, wherein
    the diagnosing unit estimates the crank angle by counting the rotation signal on the basis of a crank angle at the time of stopping the internal-combustion engine detected by the stop position detecting unit when the internal-combustion engine starts, and
    determines whether the forward and reverse rotation determining unit is abnormal or not on the basis of an estimated value of the crank angle at a time when a reference crank angle is detected after the starting of the internal-combustion engine.

4. The control apparatus for the internal-combustion engine according to claim 1, further comprising:
    a start control unit which controls the internal-combustion engine on the basis of a crank angle estimated on the basis of a crank angle at the time of stopping the internal-combustion engine detected by the stop position detecting unit in a case in which the idle reduction control unit restarts the internal-combustion engine,
    wherein the control prohibiting unit prohibits control of the internal-combustion engine on the basis of the crank angle estimated on the basis of the crank angle at the time of stopping the internal-combustion engine in the case in which the diagnosing unit determines that the forward and reverse rotation determining unit is abnormal.

5. The control apparatus for the internal-combustion engine according to claim 3, wherein the diagnosing unit determines that the forward and reverse rotation determining unit is abnormal in a case in which a difference between an estimated value of the crank angle and the reference crank angle is greater than an allowable value.

6. The control apparatus for the internal-combustion engine according to claim 2, wherein
    the rotation signal is a pulse signal composed of a pulse train for each unit angle of the crankshaft, and a pulse width of the pulse signal differs according to whether the crankshaft is rotated in the forward direction or the reverse direction, and
    the forward and reverse rotation determining unit compares a measured value of the pulse width of the rotation signal with a threshold value to determine whether the crankshaft is rotated in the forward direction or the reverse direction.

7. The control apparatus for the internal-combustion engine according to claim 1, further comprising a warning unit which warns of occurrence of an abnormality in a case in which the diagnosing unit determines that the forward and reverse rotation determining unit is abnormal.

8. The control apparatus for the internal-combustion engine according to claim 3, wherein
    the rotation signal is preset to be absent at a predetermined crank angle, and the diagnosing unit detects an absence of the rotation signal on the basis of a cycle of the rotation signal and detects a reference crank angle on the basis of the absence of the rotation signal.

9. A control method for the internal-combustion engine, comprising:
- determining whether a crankshaft of the internal-combustion engine is rotated in a rotation direction that is a forward direction or a reverse direction;
- detecting a crank angle at a time of stopping the internal-combustion engine on the basis of the determination of the rotating direction of the crankshaft;
- comparing a crank angle estimated on the basis of the detected crank angle at the time of stopping the engine with a crank angle detected after starting of internal-combustion engine so as to diagnose whether the determination of the rotating direction of the crankshaft is abnormal or not;
- automatically stopping the internal-combustion engine in a case in which a preset stop condition is established, and automatically restarting the internal-combustion engine in a case in which a preset restart condition is established, and
- prohibiting control for automatic stopping of the internal-combustion engine on the basis of the crank angle which is estimated on the basis of the crank angle at the time of stopping the internal-combustion engine in a case in which the determination of the rotation direction is diagnosed as abnormal.

* * * * *